(12) United States Patent
Yang et al.

(10) Patent No.: US 8,588,346 B2
(45) Date of Patent: Nov. 19, 2013

(54) DOPPLER FREQUENCY ESTIMATION SYSTEM AND METHOD

(75) Inventors: Kai-Jie Yang, Kaohsiung (TW); Shin-Yuan Wang, Hsinchu (TW); Weily Kuo, Baoshan Township, Hsinchu County (TW)

(73) Assignee: Sunplus mMobile Inc., Hsinchu (TW)

( * ) Notice: Subject to any disclaimer, the term of this patent is extended or adjusted under 35 U.S.C. 154(b) by 433 days.

(21) Appl. No.: 12/801,165

(22) Filed: May 26, 2010

(65) Prior Publication Data

US 2010/0303177 A1 Dec. 2, 2010

(30) Foreign Application Priority Data

May 26, 2009 (TW) .............................. 98117420 A

(51) Int. Cl.
*H04L 27/06* (2006.01)
(52) U.S. Cl.
USPC .......................................................... 375/340
(58) Field of Classification Search
USPC .......... 370/514, 515; 375/142, 147, 150, 230, 375/332, 341, 343, 350; 455/114.2; 708/319, 232, 403
See application file for complete search history.

(56) References Cited

U.S. PATENT DOCUMENTS

| | | | |
|---|---|---|---|
| 6,563,861 B1 | 5/2003 | Krasny et al. | |
| 2005/0249268 A1* | 11/2005 | Batra et al. | 375/147 |
| 2006/0222113 A1* | 10/2006 | Harrison | 375/343 |
| 2007/0160121 A1* | 7/2007 | Abraham et al. | 375/150 |
| 2009/0252263 A1* | 10/2009 | Liu et al. | 375/344 |

* cited by examiner

*Primary Examiner* — Sam K Ahn
*Assistant Examiner* — Shawkat M Ali
(74) *Attorney, Agent, or Firm* — Bacon & Thomas, PLLC

(57) ABSTRACT

A Doppler frequency estimation system includes a basis projector, a polynomial generator and an extreme value determinator. The basis projector receives and projects multiple channel sampling signals to a set of orthogonal bases to thereby generate multiple channel correlation vectors. The polynomial generator is connected to the basis projector in order to produce a target polynomial based on the channel correlation vectors, an estimated channel-envelope-to-noise-plus-interference power-ratio and a channel-envelope power. The extreme value determinator is connected to the polynomial generator in order to determine an extreme value of the polynomial and output a frequency corresponding to the extreme value as an estimated Doppler frequency.

14 Claims, 21 Drawing Sheets

| | | $f_p=1Hz$ | | | | | | | | |
|---|---|---|---|---|---|---|---|---|---|---|
| | w1 | w2 | | | | | | | | w3 |
| | | $v_1^2$ | $v_2^2$ | $v_3^2$ | $v_4^2$ | $v_5^2$ | $v_1v_2$ | $v_3v_4$ | $v_3v_5$ | $v_4v_5$ | |
| $\gamma^0$ | 1 | 0 | 0 | 0 | 0 | 0 | 0 | 0 | 0 | 0 | 0 |
| $\gamma^1$ | 40 | 6.73E-02 | 6.73E-02 | 6.73E-02 | 6.73E-02 | 6.73E-02 | -1.26E-05 | 0 | 0 | 0 | 6.73E-02 |
| $\gamma^2$ | 1.87E-02 | 2.69 | 2.69 | 1.86 | 2.59 | 9.43E-01 | -5.03E-04 | 5.96E-01 | 2.42 | -8.26E-01 | 2.69 |
| $\gamma^4$ | 0 | -1.21E-03 | -5.23E-05 | 0 | 0 | 0 | 0 | 0 | 0 | 0 | 0 |

FIG. 6

| | $f_p=41Hz$ | | | | | | | | | |
|---|---|---|---|---|---|---|---|---|---|---|
| | w1 | w2 | | | | | | | | w3 |
| | | $v_1^2$ | $v_2^2$ | $v_3^2$ | $v_4^2$ | $v_5^2$ | $v_1v_2$ | $v_3v_4$ | $v_3v_5$ | $v_4v_5$ | |
| $\gamma^0$ | 1 | 0 | 0 | 0 | 0 | 0 | 0 | 0 | 0 | 0 | 6.73E-02 |
| $\gamma^1$ | 40 | 6.73E-02 | 6.73E-02 | 6.73E-02 | 6.73E-02 | 6.73E-02 | -2.11E-02 | 6.00E-01 | 2.39 | -8.25E-01 | 2.64 |
| $\gamma^2$ | 3.04E+01 | 2.69 | 2.64 | 1.80 | 2.53 | 9.47E-01 | -8.12E-01 | 7.73E-04 | 2.48E-05 | 6.18E-05 | -4.76E-02 |
| $\gamma^3$ | 1.27E-02 | -1.97 | -1.33E-01 | -4.86E-02 | -4.78E-02 | -4.87E-02 | 6.45E-01 | -4.34E-01 | -1.73 | 6.17E-01 | -1.92 |
| $\gamma^4$ | 0 | -3.92E-01 | -1.85 | -1.30 | -1.84 | -6.92E-01 | 1.02E-01 | -5.74E-02 | -2.26E-01 | 8.07E-02 | -2.51E-01 |
| $\gamma^5$ | 0 | -1.09E-02 | -2.40E-01 | -1.71E-01 | -2.41E-01 | -8.98E-02 | 4.28E-05 | -7.29E-05 | 0 | 0 | -1.04E-04 |

FIG. 7

| | w1 | w2 | | | | | | | | w3 |
|---|---|---|---|---|---|---|---|---|---|---|
| | | $v_1^2$ | $v_2^2$ | $v_3^2$ | $v_4^2$ | $v_5^2$ | $v_1v_2$ | $v_3v_4$ | $v_3v_5$ | $v_4v_5$ | |
| $r^0$ | 1 | 0 | 0 | 0 | 0 | 0 | 0 | 0 | 0 | 0 | 6.73E-03 |
| $r^1$ | 40 | 6.73E-03 | 6.73E-03 | 6.73E-03 | 6.73E-03 | 6.73E-03 | -8.24E-03 | 6.11E-02 | 2.28E-01 | -8.23E-02 | 2.50E-01 |
| $r^2$ | 1.08E+02 | 2.31E-01 | 2.49E-01 | 1.65E-01 | 2.39E-01 | 9.58E-02 | -2.82E-01 | 1.37E-03 | 2.13E-05 | 6.22E-05 | -6.72E-02 |
| $r^3$ | 8.36E-01 | -7.06E-01 | -9.81E-02 | -6.89E-02 | -6.74E-02 | -6.92E-02 | 9.02E-01 | -6.28E-01 | -2.35 | 8.46E-01 | -2.60 |
| $r^4$ | -3.70E-04 | -5.57E-01 | -2.50 | -1.73 | -2.49 | -1.02 | 5.61E-01 | -3.36E-01 | -1.20 | 4.33E-01 | -1.34 |
| $r^5$ | 0 | -6.54E-02 | -1.28 | -8.71E-01 | -1.28 | -5.05E-01 | 4.52E-03 | -7.06E-03 | 3.79E-04 | -5.05E-04 | -1.02E-02 |
| $r^6$ | 0 | -4.97E-04 | -1.02E-02 | -1.02E-03 | -8.85E-03 | 2.08E-04 | 0 | 0 | 0 | 0 | 0 |

| | w1 | w2 | | | | | | | | | w3 |
|---|---|---|---|---|---|---|---|---|---|---|---|
| | | $v_1^2$ | $v_2^2$ | $v_3^2$ | $v_4^2$ | $v_5^2$ | $v_1v_2$ | $v_3v_4$ | $v_3v_5$ | $v_4v_5$ | |
| $r^0$ | 1 | 0 | 0 | 0 | 0 | 0 | 0 | 0 | 0 | 0 | 6.73E-04 |
| $r^1$ | 40 | 6.73E-04 | 6.73E-04 | 6.73E-04 | 6.73E-04 | 6.73E-04 | -1.84E-03 | 6.30E-03 | 2.12E-02 | -7.75E-03 | 2.29E-02 |
| $r^2$ | 2.07E+02 | 1.90E-02 | 2.26E-02 | 1.43E-02 | 2.17E-02 | 9.75E-03 | -5.13E-02 | 8.34E-04 | -2.90E-06 | 4.69E-06 | -2.92E-02 |
| $r^3$ | 1.05E+01 | -1.37E-01 | -3.52E-02 | -3.04E-02 | -2.94E-02 | -3.05E-02 | 3.91E-01 | -2.86E-01 | -9.59E-01 | 3.51E-01 | -1.07 |
| $r^4$ | -5.85E-02 | -2.51E-01 | -1.03 | -6.81E-01 | -1.02 | -4.77E-01 | 5.60E-01 | -3.66E-01 | -1.10 | 4.03E-01 | -1.25 |
| $r^5$ | 1.09E-05 | -7.67E-02 | -1.19 | -7.49E-01 | -1.18 | -5.07E-01 | 3.02E-02 | -4.18E-02 | 5.50E-03 | -2.20E-03 | -6.08E-02 |
| $r^6$ | 0 | -3.54E-03 | -6.33E-02 | -4.25E-03 | -5.34E-02 | 2.56E-03 | 0 | 2.11E-04 | 0 | 0 | 3.37E-04 |
| $r^7$ | 0 | 0 | 0 | 3.84E-05 | 2.86E-04 | 0 | 0 | 0 | 0 | 0 | 0 |

| | w1 | w2 | | | | | | | | | w3 |
|---|---|---|---|---|---|---|---|---|---|---|---|
| | | $v_1^2$ | $v_2^2$ | $v_3^2$ | $v_4^2$ | $v_5^2$ | $v_1v_2$ | $v_3v_4$ | $v_3v_5$ | $v_4v_5$ | |
| $\gamma^0$ | 1 | 0 | 0 | 0 | 0 | 0 | 0 | 0 | 0 | 0 | 6.73E-04 |
| $\gamma^1$ | 40 | 6.73E-04 | 6.73E-04 | 6.73E-04 | 6.73E-04 | 6.73E-04 | 0 | 0 | 0 | 0 | 2.04E-02 |
| $\gamma^2$ | 3.00E+02 | 1.44E-02 | 2.00E-02 | 1.17E-02 | 1.92E-02 | 9.95E-03 | -3.26E-03 | 6.30E-03 | 1.88E-02 | -7.08E-03 | -7.49E-02 |
| $\gamma^3$ | 6.40E+01 | -2.01E-01 | -8.33E-02 | -7.94E-02 | -7.54E-02 | -8.00E-02 | -6.75E-02 | 3.29E-03 | -6.82E-05 | -1.00E-04 | -2.59 |
| $\gamma^4$ | -2.31E+00 | -6.98E-01 | -2.46 | -1.56 | -2.44 | -1.13 | 1.01 | -7.78E-01 | -2.23 | 8.40E-01 | -5.56 |
| $\gamma^5$ | 3.29E-03 | -4.80E-01 | -5.27 | -2.91 | -5.19 | -2.41 | 2.75 | -1.98 | -4.55 | 1.73 | -1.08 |
| $\gamma^6$ | 0 | -7.97E-02 | -1.17 | -5.56E-02 | -9.56E-01 | 7.9E-02 | 6.27E-01 | -7.50E-01 | 1.54E-01 | -2.72E-02 | 3.90E-02 |
| $\gamma^7$ | 0 | 8.40E-05 | 1.23E-03 | 4.27E-03 | 3.30E-02 | -7.02E-05 | -6.59E-04 | 2.40E-02 | -4.35E-04 | -7.55E-04 | -3.88E-05 |
| $\gamma^8$ | 0 | 0 | 0 | 0 | 1.49E-05 | 0 | 0 | 1.08E-05 | 0 | 0 | 0 |

| | | $f_p$=201Hz | | | | | | | | |
|---|---|---|---|---|---|---|---|---|---|---|
| | w1 | w2 | | | | | | | | w3 |
| | | $v_1^2$ | $v_2^2$ | $v_3^2$ | $v_4^2$ | $v_5^2$ | $v_1 v_2$ | $v_3 v_4$ | $v_3 v_5$ | $v_4 v_5$ | |
| $\gamma^0$ | 1 | 0 | 0 | 0 | 0 | 0 | 0 | 0 | 0 | 0 | 6.73E-05 |
| $\gamma^1$ | 40 | 6.73E-05 | 6.73E-05 | 6.73E-05 | 6.73E-05 | 6.73E-05 | -5.08E-04 | 6.89E-04 | 1.58E-03 | -6.22E-04 | 1.83E-03 |
| $\gamma^2$ | 3.70E+02 | 1.03E-03 | 1.76E-03 | 9.45E-04 | 1.69E-03 | 1.02E-03 | -7.24E-03 | 1.01E-03 | -3.50E-05 | -6.03E-05 | -1.36E-02 |
| $\gamma^3$ | 2.47E+02 | -2.48E-02 | 1.45E-02 | -1.50E-02 | -1.38E-02 | -1.51E-02 | 1.95E-01 | -1.55E-01 | -3.55E-01 | 1.40E-01 | -4.59E-01 |
| $\gamma^4$ | -4.12E+01 | -1.52E-01 | -4.30E-01 | -2.61E-01 | -4.29E-01 | -2.76E-01 | 9.39E-01 | -7.20E-01 | -1.12 | 4.59E-01 | -1.65 |
| $\gamma^5$ | 2.78E-01 | -2.20E-01 | -1.56 | -7.11E-01 | -1.51 | -7.19E-01 | 6.65E-01 | -6.57E-01 | 1.77E-01 | -1.67E-02 | -9.22E-01 |
| $\gamma^6$ | 0 | -9.29E-04 | -1.04 | -3.85E-02 | -8.12E-01 | 1.02E-01 | -2.84E-03 | 9.74E-02 | -2.93E-03 | -5.98E-03 | 1.56E-01 |
| $\gamma^7$ | 0 | 4.01E-04 | 4.46E-03 | 1.77E-02 | 1.32E-01 | -3.34E-04 | -1.33E-05 | 2.81E-04 | 0 | -1.68E-05 | -6.24E-04 |
| $\gamma^8$ | 0 | 0 | 2.09E-05 | 5.03E-05 | 3.79E-04 | 0 | 0 | 0 | 0 | 0 | 0 |

FIG. 11

| | z1 | z2 | w2 | | | | | | | | | d_h |
|---|---|---|---|---|---|---|---|---|---|---|---|---|
| | | | $v_1^2$ | $v_2^2$ | $v_3^2$ | $v_4^2$ | $v_5^2$ | $v_1v_2$ | $v_3v_4$ | $v_3v_5$ | $v_4v_5$ | |
| $\gamma^0$ | 0 | -3.72E-01 | 0 | 0 | 0 | 0 | 0 | 0 | 0 | 0 | 0 | 4.53 |
| $\gamma^1$ | 0 | -1.49E+01 | 0 | 0 | 0 | 0 | 0 | 0 | 0 | 0 | 0 | 3.63E+02 |
| $\gamma^2$ | -1.39E-02 | -6.96E-03 | -4.06E-03 | -1.76E-04 | -2.40E-04 | -7.90E-05 | 4.56E-03 | -1.69E-03 | 3.07E-04 | -2.81E-03 | 8.02E-04 | 7.25E+03 |
| $\gamma^3$ | 0 | 0 | -3.25E-01 | -1.41E-02 | -6.23E-02 | -9.85E-03 | 7.22E-02 | -1.35E-01 | 4.98E-02 | 4.02E-02 | -2.22E-02 | -1.88E-04 |
| $\gamma^4$ | 0 | 0 | -6.50 | -2.82E-01 | -2.15E-06 | -4.24E-07 | -1.38E-06 | -2.71 | 1.91E-06 | -3.45E-06 | 1.53E-06 | -3.81E-03 |
| $\gamma^5$ | 0 | 0 | 6.08E-03 | 2.64E-04 | 3.27E-08 | 5.17E-09 | -3.79E-08 | 2.53E-03 | -2.62E-08 | -2.11E-08 | 1.17E-08 | -2.96E-07 |

| | z1 | z2 | w2 | | | | | | | | | $d_h$ |
|---|---|---|---|---|---|---|---|---|---|---|---|---|
| | | | $v_1^2$ | $v_2^2$ | $v_3^2$ | $v_4^2$ | $v_5^2$ | $v_1 v_2$ | $v_3 v_4$ | $v_3 v_5$ | $v_4 v_5$ | |
| $r^0$ | 0 | -3.72E-01 | 0 | 0 | 0 | 0 | 0 | 0 | 0 | 0 | 0 | 0 |
| $r^1$ | 0 | -1.49E+01 | 0 | 0 | 0 | 0 | 0 | 0 | 0 | 0 | 0 | 3.56 |
| $r^2$ | -5.35E-01 | -1.13E+01 | -1.62E-03 | -7.43E-05 | -9.52E-05 | -3.29E-05 | 1.82E-03 | -6.94E-04 | 1.26E-04 | -1.15E-03 | 3.29E-04 | 6.97E+01 |
| $r^3$ | -6.99E-04 | -4.71E-03 | -1.24E-01 | -5.27E-03 | -2.49E-02 | -3.99E-03 | 2.88E-02 | -5.34E-02 | 2.01E-02 | 1.48E-02 | -8.51E-03 | -5.10 |
| $r^4$ | 0 | 0 | -2.29 | -1.05E-01 | -1.51E-03 | -2.46E-04 | -3.70E-03 | -9.84E-01 | 1.21E-03 | -9.82E-04 | 6.41E-04 | -1.02E+02 |
| $r^5$ | 0 | 0 | 3.82 | 1.73E-01 | 3.61E-02 | 5.79E-03 | -4.20E-02 | 1.63 | -2.91E-02 | -2.13E-02 | 1.23E-02 | -1.14E+01 |
| $r^6$ | 0 | 0 | -9.14E-01 | -3.82E-02 | 7.06E-03 | 1.16E-03 | -2.96E-03 | -3.73E-01 | -5.76E-03 | 4.18E-03 | 1.68E-04 | 3.70E+01 |
| $r^7$ | 0 | 0 | -4.74E-01 | -2.27E-02 | -1.28E-02 | -2.04E-03 | 1.55E-02 | -2.08E-01 | 1.03E-02 | 8.12E-03 | -4.63E-03 | 9.63 |
| $r^8$ | 0 | 0 | -3.71E-02 | -2.16E-03 | -4.28E-03 | -7.02E-04 | 3.40E-03 | -1.82E-02 | 3.49E-03 | 6.38E-04 | -5.79E-04 | 6.34E-01 |
| $r^9$ | 0 | 0 | 6.41E-06 | -2.94E-05 | -4.50E-04 | -7.61E-05 | 1.12E-04 | -1.84E-04 | 3.71E-04 | -2.30E-04 | 7.68E-05 | 5.23E-04 |
| $r^{10}$ | 0 | 0 | 0 | 0 | -1.48E-05 | 0 | 0 | 0 | 1.25E-05 | -2.38E-05 | 1.00E-05 | 0 |

| | z1 | z2 | w2 | | | | | | | | | | d_h |
|---|---|---|---|---|---|---|---|---|---|---|---|---|---|
| | | | $v_1^2$ | $v_2^2$ | $v_3^2$ | $v_4^2$ | $v_5^2$ | $v_1 v_2$ | $v_3 v_4$ | $v_3 v_5$ | $v_4 v_5$ | | |
| $r^0$ | 0 | -3.72E-01 | | | | | | | | | | 0 | |
| $r^1$ | 0 | -1.49E+01 | | | | | | | | | | 3.36E-01 | |
| $r^2$ | -8.70E-01 | -4.03E+01 | -2.92E-04 | -1.59E-05 | -1.70E-05 | 0 | 3.32E-04 | -1.37E-04 | 2.49E-05 | -2.27E-04 | 6.50E-05 | 6.15 | |
| $r^3$ | -2.40E-02 | -3.11E-01 | -2.00E-02 | -1.09E-03 | -4.57E-03 | -7.64E-04 | 5.19E-03 | -9.39E-03 | 3.77E-03 | 2.02E-03 | -1.35E-03 | -6.86 | |
| $r^4$ | 0 | 0 | -2.77E-01 | -1.54E-02 | -1.24E-03 | -9.11E-05 | -7.88E-03 | -1.32E-01 | 7.15E-04 | 2.07E-03 | -3.44E-04 | -1.31E+02 | |
| $r^5$ | 0 | 0 | 2.23 | 1.17E-01 | 9.42E-02 | 1.58E-02 | -1.10E-01 | 1.02 | -7.77E-04 | -3.90E-02 | 2.71E-02 | -3.18E+01 | |
| $r^6$ | 0 | 0 | -2.18 | -8.31E-02 | 7.90E-02 | 1.21E-02 | 2.27E-03 | -8.38E-01 | -6.23E-02 | 8.31E-03 | 7.25E-04 | 6.94E+02 | |
| $r^7$ | 0 | 0 | -4.30 | -2.75E-01 | -4.68E-01 | -7.90E-02 | 5.95E-01 | -2.19 | 3.88E-01 | 2.16E-01 | -1.46E-01 | 6.95E+02 | |
| $r^8$ | 0 | 0 | -1.31 | -1.30E-01 | -6.63E-01 | -1.07E-01 | 4.58E-01 | -9.78E-01 | 5.38E-01 | -6.33E-02 | -3.98E-02 | 1.84E+02 | |
| $r^9$ | 0 | 0 | 4.03E-03 | -4.30E-03 | -2.98E-02 | -4.60E-02 | 2.84E-02 | -1.21E-01 | 2.37E-01 | -2.26E-01 | 6.98E-02 | 2.72 | |
| $r^{10}$ | 0 | 0 | 5.57E-04 | 5.07E-03 | -4.38E-02 | -6.33E-03 | -2.96E-02 | -4.00E-03 | 3.38E-03 | -7.21E-02 | 2.75E-02 | 9.19E-03 | |
| $r^{11}$ | 0 | 0 | | 8.33E-05 | 3.39E-05 | 1.10E-05 | 2.46E-05 | -4.31E-05 | -3.38E-05 | 5.72E-05 | -3.10E-05 | | |

| | | | w2 $f_p$= 121Hz | | | | | | | | | $d_h$ |
|---|---|---|---|---|---|---|---|---|---|---|---|---|
| | z1 | z2 | $v_1^2$ | $v_2^2$ | $v_3^2$ | $v_4^2$ | $v_5^2$ | $v_1 v_2$ | $v_3 v_4$ | $v_3 v_5$ | $v_4 v_5$ | |
| $\gamma^0$ | 0 | -3.72E-01 | 0 | 0 | 0 | 0 | 0 | 0 | 0 | 0 | 0 | 0 |
| $\gamma^1$ | 0 | -1.49E+01 | 0 | 0 | 0 | 0 | 0 | 0 | 0 | 0 | 0 | 0 |
| $\gamma^2$ | -9.30E-01 | -7.72E+01 | -3.68E-05 | 0 | 0 | 0 | 0 | 0 | 0 | 0 | 0 | 3.08E-02 |
| $\gamma^3$ | -2.05E-01 | -3.91 | -2.05E-03 | -1.52E-04 | -6.04E-04 | -1.08E-04 | 6.45E-04 | -1.16E-03 | 5.17E-04 | 8.70E-05 | -1.25E-04 | 4.83E-01 |
| $\gamma^4$ | 0 | 0 | -1.28E-02 | -1.09E-03 | -4.64E-04 | 1.75E-05 | -4.35E-03 | -8.14E-03 | 1.40E-04 | 1.94E-03 | -4.88E-04 | -2.78 |
| $\gamma^5$ | 0 | 0 | 4.60E-01 | 3.25E-02 | 5.50E-02 | 9.89E-03 | -6.29E-02 | 2.49E-01 | -4.73E-02 | -4.36E-03 | 1.03E-02 | -4.98E+01 |
| $\gamma^6$ | 0 | 0 | -1.09 | -4.07E-02 | 1.18E-01 | 1.63E-02 | 6.43E-02 | -3.74E-01 | -8.94E-02 | 2.40E-02 | -2.54E-03 | 5.53 |
| $\gamma^7$ | 0 | 0 | -4.60 | -4.66E-01 | -1.18 | -2.19E-01 | 1.58 | -3.06 | 1.03 | 1.37E-01 | -2.52E-01 | 1.22E+03 |
| $\gamma^8$ | 0 | 0 | -3.09 | -4.92E-01 | -4.20 | -6.77E-01 | 2.16 | -4.17 | 3.43 | -2.01 | 2.41E-01 | 1.68E+03 |
| $\gamma^9$ | 0 | 0 | 9.80E-02 | 2.24E-01 | -4.71 | -6.66E-01 | -5.53E-01 | -2.05 | 3.64 | -5.12 | 1.51 | 1.69E+03 |
| $\gamma^{10}$ | 0 | 0 | 5.46E-02 | 3.71E-01 | -1.74 | -2.08E-01 | -1.32 | -3.48E-01 | 1.27 | -3.05 | 1.05 | 1.51E+02 |
| $\gamma^{11}$ | 0 | 0 | 3.23E-03 | 3.92E-02 | 1.74E-02 | 4.58E-03 | 1.33E-02 | -2.25E-02 | -1.34E-02 | 3.00E-02 | -1.37E-02 | 2.86 |
| $\gamma^{12}$ | 0 | 0 | 5.45E-05 | 1.07E-03 | -3.68E-05 | 1.64E-05 | -3.53E-05 | -4.85E-04 | 7.28E-05 | -7.21E-05 | 5.80E-05 | -4.09E-02 |

$f_p$= 161Hz

| | $z_1$ | $z_2$ | $w_2$ | | | | | | | | | $d_h$ |
|---|---|---|---|---|---|---|---|---|---|---|---|---|
| | | | $v_1^2$ | $v_2^2$ | $v_3^2$ | $v_4^2$ | $v_5^2$ | $v_1v_2$ | $v_3v_4$ | $v_3v_5$ | $v_4v_5$ | |
| $\gamma^0$ | 0 | -3.72E-01 | 0 | 0 | 0 | 0 | 0 | 0 | 0 | 0 | 0 | 0 |
| $\gamma^1$ | 0 | -1.49E+01 | 0 | 0 | 0 | 0 | 0 | 0 | 0 | 0 | 0 | 2.75E-04 |
| $\gamma^2$ | -7.67E-01 | -1.12E+02 | 0 | 0 | 0 | 0 | 0 | 0 | 0 | 0 | 0 | 3.17E-03 |
| $\gamma^3$ | -9.26E-01 | 8.58E-01 | -1.48E-05 | 0 | 0 | 0 | 0 | 0 | 0 | 0 | 0 | -6.55E-02 |
| $\gamma^4$ | 6.90E-02 | 0 | 7.85E-05 | 0 | -1.29E-05 | 0 | -1.20E-04 | -1.20E-05 | 0 | 0 | 0 | -1.08 |
| $\gamma^5$ | 0 | 0 | 5.24E-03 | 6.33E-04 | 1.61E-03 | 3.23E-04 | -1.63E-03 | 2.42E-05 | -1.48E-03 | 7.39E-05 | -1.99E-05 | 1.59 |
| $\gamma^6$ | 0 | 0 | -2.53E-02 | -1.41E-03 | 7.14E-03 | 9.09E-04 | 6.94E-03 | 4.09E-03 | -5.30E-03 | 8.04E-04 | 2.27E-05 | 7.50E+01 |
| $\gamma^7$ | 0 | 0 | -1.75E-01 | -3.33E-02 | -8.78E-02 | -1.85E-02 | 1.17E-01 | -6.78E-03 | 8.29E-02 | 2.76E-03 | -5.55E-04 | 2.89E+02 |
| $\gamma^8$ | 0 | 0 | -1.91E-01 | -4.66E-02 | -6.36E-01 | -1.06E-01 | 1.52E-01 | -1.79E-01 | 5.35E-01 | -4.46E-02 | -2.82E-03 | 3.65E+02 |
| $\gamma^9$ | 0 | 0 | 7.39E-02 | 1.70E-01 | -1.39 | -1.92E-01 | -5.44E-01 | -5.91E-01 | 1.09 | -6.39E-01 | 1.38E-01 | 1.18E+02 |
| $\gamma^{10}$ | 0 | 0 | 7.94E-02 | 3.77E-01 | -9.69E-01 | -1.05E-01 | -8.59E-01 | -7.74E-01 | 7.12E-01 | -2.06 | 5.96E-01 | 7.42 |
| $\gamma^{11}$ | 0 | 0 | 1.71E-02 | 1.55E-01 | 6.55E-02 | 1.51E-02 | 5.73E-02 | -4.27E-01 | -4.12E-02 | -1.90 | 6.05E-01 | -8.40E-01 |
| $\gamma^{12}$ | 0 | 0 | 1.03E-03 | 1.78E-02 | -1.04E-03 | 3.19E-04 | -9.59E-04 | -1.02E-01 | 1.10E-03 | 1.21E-01 | -4.83E-02 | 1.60E-02 |
| $\gamma^{13}$ | 0 | 0 | 0 | -3.79E-05 | 0 | -4.71E-05 | 0 | -8.66E-03 | -3.54E-05 | -1.89E-03 | 1.18E-03 | -2.97E-05 |

FIG. 16

|  | z1 | z2 | \multicolumn{9}{c}{w2, $f_p$=201Hz} | $d_h$ |
|---|---|---|---|---|---|---|---|---|---|---|---|---|
|  |  |  | $v_1^2$ | $v_2^2$ | $v_3^2$ | $v_4^2$ | $v_5^2$ | $v_1v_2$ | $v_3v_4$ | $v_3v_5$ | $v_4v_5$ |  |
| $\gamma^0$ | 0 | -3.72E-01 | 0 | 0 | 0 | 0 | 0 | 0 | 0 | 0 | 0 | 0 |
| $\gamma^1$ | 0 | -1.49E+01 | 0 | 0 | 0 | 0 | 0 | 0 | 0 | 0 | 0 | 2.46E-05 |
| $\gamma^2$ | -5.48E-01 | -1.38E+02 | 0 | 0 | 0 | 0 | 0 | 0 | 0 | 0 | 0 | 1.50E-04 |
| $\gamma^3$ | -2.66 | -9.19E+01 | 0 | 0 | 0 | 0 | 0 | 0 | 0 | 0 | 0 | -1.12E-02 |
| $\gamma^4$ | 9.93E-01 | 1.53E+01 | 1.62E-05 | 0 | 0 | 0 | 0 | 1.32E-05 | 0 | 1.78E-05 | 0 | -1.71E-01 |
| $\gamma^5$ | 0 | 0 | 3.23E-04 | 1.05E-04 | 2.98E-04 | 7.08E-05 | -1.18E-04 | 6.08E-04 | -3.05E-04 | 4.46E-04 | -8.49E-05 | 6.34E-01 |
| $\gamma^6$ | 0 | 0 | -3.41E-03 | -5.35E-04 | 2.42E-03 | 3.08E-04 | 3.05E-03 | -3.23E-05 | -1.85E-03 | 1.71E-03 | -4.22E-04 | 2.52E+01 |
| $\gamma^7$ | 0 | 0 | -2.78E-02 | -1.43E-02 | -2.90E-02 | -7.72E-03 | 3.14E-02 | -6.33E-02 | 3.15E-02 | -4.86E-02 | 8.89E-03 | 1.54E+02 |
| $\gamma^8$ | 0 | 0 | -3.93E-03 | -1.57E-02 | -3.85E-01 | -7.22E-02 | -8.51E-02 | -4.50E-01 | 3.52E-01 | -6.73E-01 | 1.70E-01 | 3.55E+02 |
| $\gamma^9$ | 0 | 0 | 2.45E-01 | 3.57E-01 | -1.40 | -2.10E-01 | -1.11 | -1.31 | 1.19 | -2.81 | 8.03E-01 | 2.89E+02 |
| $\gamma^{10}$ | 0 | 0 | 4.23E-01 | 1.35 | -1.47 | -1.60E-01 | -1.83 | -1.82 | 1.23 | -3.43 | 1.02 | 3.36E+01 |
| $\gamma^{11}$ | 0 | 0 | 2.37E-01 | 1.54 | 5.16E-01 | 1.15E-01 | 5.62E-01 | -1.19 | -2.82E-01 | 1.07 | -3.90E-01 | -2.86E+01 |
| $\gamma^{12}$ | 0 | 0 | 3.69E-02 | 5.48E-01 | -4.21E-02 | 9.12E-03 | -4.22E-02 | -2.94E-01 | 2.01E-02 | -7.61E-02 | 4.05E-02 | 2.56 |
| $\gamma^{13}$ | 0 | 0 | -3.34E-04 | -4.77E-03 | -1.16E-04 | -6.46E-03 | 3.24E-04 | 2.59E-03 | -3.65E-03 | 2.65E-04 | -9.88E-04 | -1.89E-02 |
| $\gamma^{14}$ | 0 | 0 | 0 | -1.21E-05 | 6.37E-05 | 4.64E-04 | 0 | 0 | 3.41E-04 | 0 | -2.14E-05 | -5.59E-05 |

FIG. 17

DOPPLER FREQUENCY ESTIMATION SYSTEM AND METHOD

BACKGROUND OF THE INVENTION

1. Field of the Invention

The present invention relates to the technical field of wireless transmissions and, more particularly, to a Doppler frequency estimation system and method.

2. Description of Related Art

The wireless transmission channels are dynamically changed with a relative motion of a transmitter and a receiver. The statistic of time-varying features for a wireless transmission channel is highly dependent of a Doppler spectrum. The Doppler spectrum is obtained by performing a Fourier transformation on the autocorrelation function of a channel pulse response, also referred to as a Doppler spread. The Doppler spread is positively proportional to the relative motion speed between a transmitter and a receiver.

The channel's features are varied over time due to the Doppler effect. This increases the uncertainty of the signal quality. In addition, the Doppler spread causes a frequency offset at the receiver to thereby increase the bit error rate (BER) of the receiver. Thus, estimating the Doppler spread and the motion speed at the receiver can directly influence the performance of a mobile communication system. For example, for code division multiple access (CDMA) systems such as IS-05, WCDMA and CDMA2000, the motion speed at the receiver is used as a reference of the important parameter of switching a mobile or cell phone system. In orthogonal frequency division multiplexing (OFDM) systems, accurately estimating the Doppler spread and the motion speed at the receiver can benefit the synchronous and time-varying channel estimations at the receiver.

U.S. Pat. No. 6,563,861 granted to Krasny et al. for a "Doppler spread estimation system" has disclosed a method of using a Fourier transformation to directly estimate the maximum bandwidth of a Doppler spectrum. FIG. 1 is a schematic diagram of a direct maximum bandwidth estimation typically using a Fourier transformation. As shown in FIG. 1, a multiplier 26 receives the sampled received signals $r_n$ and multiplies the signal by the transmitted symbols $d*_n$ to thereby produce a corresponding autocorrelation function which is subsequently passed through a low pass filter (LPF) 28 to thereby eliminate the high-frequency noises. A second processing block 30 performs a fast Fourier transformation (FFT) to change the autocorrelation function to be in frequency domain to thereby produce a signal spectrum. A third processing function 32 is a multi-channel correlator, and each channel of which performs a correlation operation in frequency domain on the bands of the signal and the Doppler spectra to thereby produce a likelihood ratio metric. A maximum function block 34 selects the frequency corresponding to a maximum likelihood ration metric as an estimate of actual Doppler frequency.

Such a technology mentioned above can directly determine the estimate of actual Doppler frequency. However, due to a limit of the motion speed at the receiver, a Doppler frequency generally ranges from a couple of 10 Hz to 1.5 KHz. For accurately estimating the Doppler frequency, the second processing block 30 performs the FFT under a higher resolution requirement. Namely, the data amount to be processed in frequency domain becomes more and thus the entire system cost is increased. However, the data amount is reduced as the resolution is reduced on the FFT performed by the second processing block 30, but the Doppler frequency at the receiver cannot be accurately estimated, resulting in negatively affecting the system performance.

Therefore, it is desirable to provide an improved Doppler frequency estimation system and method to mitigate and/or obviate the aforementioned problems.

SUMMARY OF THE INVENTION

An object of the present invention is to provide a Doppler frequency estimation system, which can reduce the processed data amount, save the system cost, and accurately and rapidly estimate the Doppler frequency.

Another object of the present invention is to provide a Doppler frequency estimation method, which can reduce the processed data amount, save the system cost, and accurately and rapidly estimate the Doppler frequency.

In accordance with one aspect of the invention, a Doppler frequency estimation system is provided. The estimation system includes a basis projector, a polynomial generator and an extreme value determinator. The basis projector receives and projects multiple channel sampling signals to a set of orthogonal bases to thereby generate multiple channel correlation vectors. The polynomial generator is connected to the basis projector in order to accord to the channel correlation vectors, an estimated channel-envelope-to-noise-and-interference-power ratio and a channel-envelope power to produce a target polynomial. The extreme value determinator is connected to the polynomial generator in order to determine an extreme value of the polynomial and output a frequency corresponding to the extreme value as an estimated Doppler frequency.

In accordance with another aspect of the invention, a Doppler frequency estimation method is also provided. The estimation method includes a basis projecting step which receives and projects multiple channel sampling signals to a set of orthogonal bases to thereby generate multiple channel correlation vectors; a polynomial generating step which is based on the channel correlation vectors, an estimated channel-envelope-to-noise-and-interference-power ratio and a channel-envelope power to produce a target polynomial; and an extreme value determining step which determines an extreme value of the polynomial and outputs a frequency corresponding to the extreme value as an estimated Doppler frequency.

As cited, the Doppler frequency estimation system and method can reduce the processed data amount and the system cost, as well as the Doppler frequency is estimated accurately and rapidly, without requiring a great computation.

Other objects, advantages, and novel features of the invention will become more apparent from the following detailed description when taken in conjunction with the accompanying drawings.

BRIEF DESCRIPTION OF THE DRAWINGS

FIGS. 6-11 schematically illustrates values of w1, w2, w3 of $f_p^{(cand)}$ respectively at 1 Hz, 41 Hz, 81 Hz, 121 Hz, 161 Hz, 201 Hz according to an embodiment of the invention;

FIGS. 12-17 schematically illustrates values of z1, z2, z3, z4 of $f_p^{(cand)}$ respectively at 1 Hz, 41 Hz, 81 Hz, 121 Hz, 161 Hz, 201 Hz according to an embodiment of the invention;

DETAILED DESCRIPTION OF THE PREFERRED EMBODIMENT

Features and advantages of the present invention will be more clearly understood by the following detailed description of the present preferred embodiments by reference to the accompanying drawings.

Figure 1:
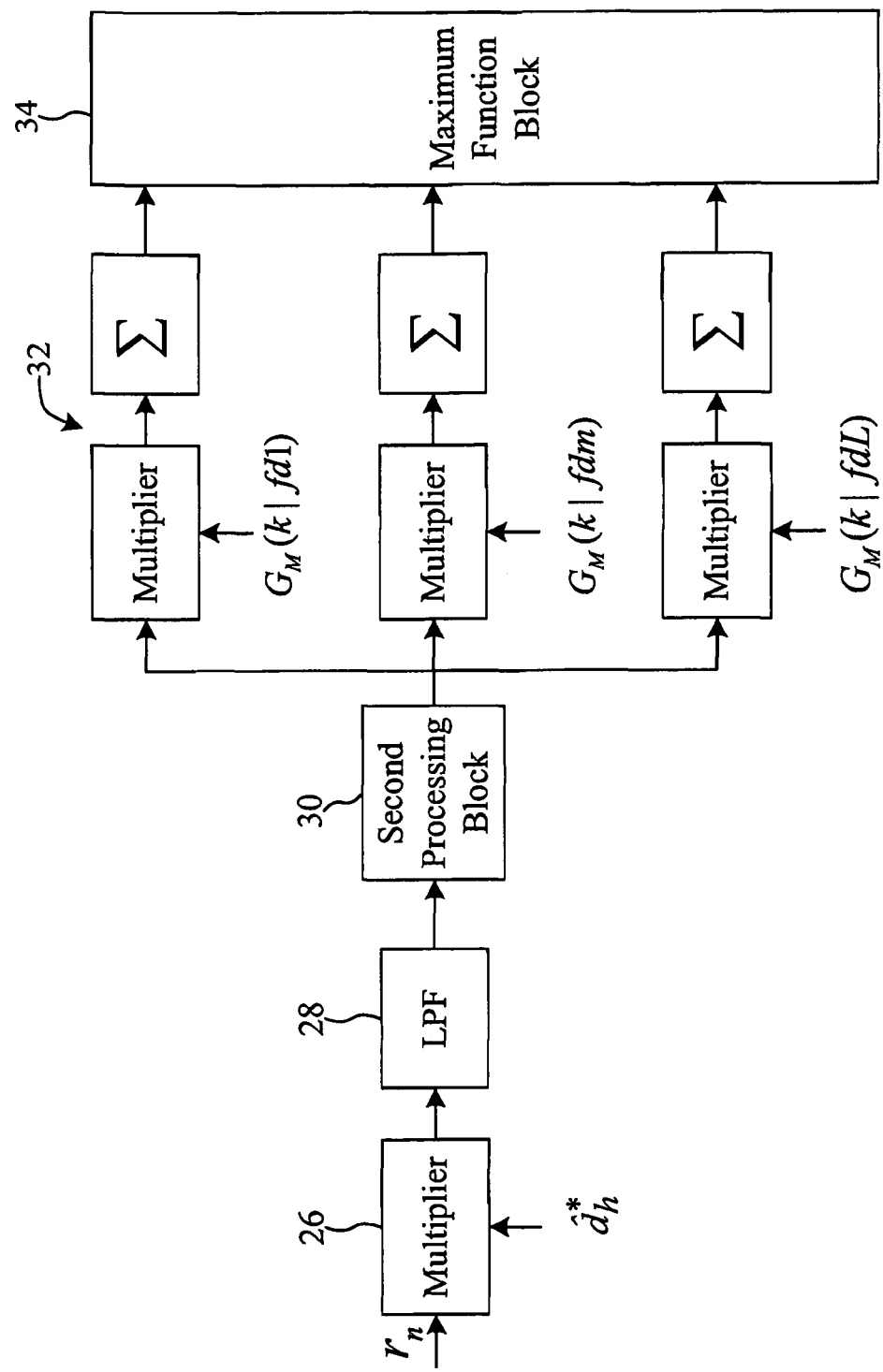
FIG. 1 is a schematic diagram of a direct maximum bandwidth estimation typically using a Fourier transformation.
Figure 2:
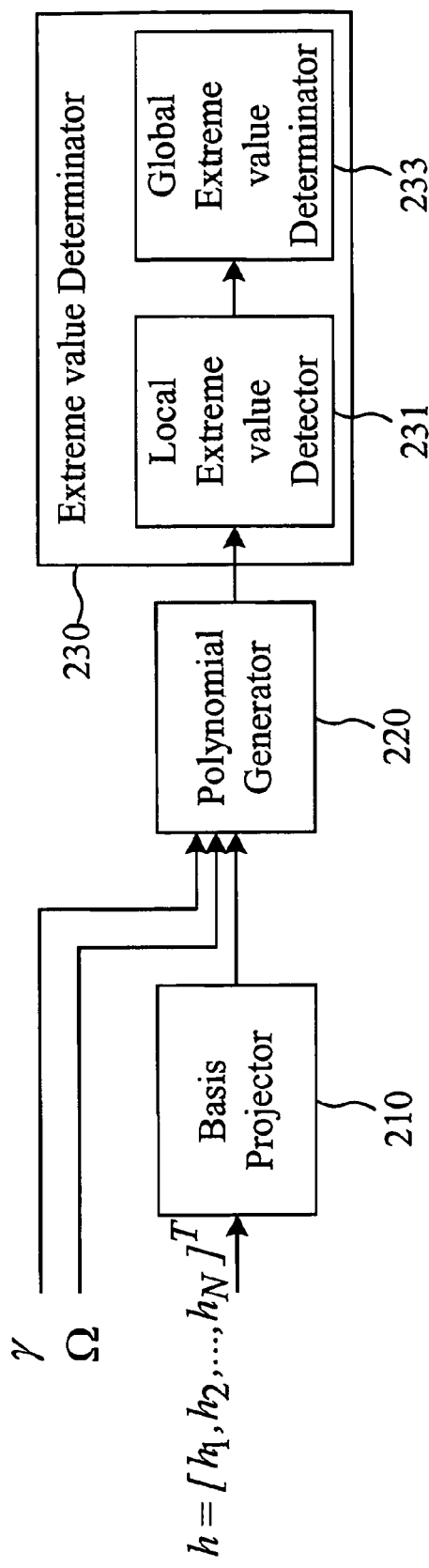
FIG. 2 is a schematic diagram of a configuration of a Doppler frequency estimation system according to an embodiment of the invention.

FIG. 2 is a schematic diagram of a configuration of a Doppler frequency estimation system according to an embodiment of the invention, which is applied to a receiver of a wireless transmission system. The estimation system includes a basis projector 210, a polynomial generator 220 and an extreme value determinator 230.

The basis projector 210 receives and projects N channel sampling signals $h=[h_1, h_2, \ldots, h_N]^T$ to a set of orthogonal bases $V_K$ to thereby generate multiple channel correlation vectors $\nu$, i.e., $\nu = V^T h$.

The polynomial generator 220 is connected to the basis projector 210 in order to accord to the channel correlation vectors $\nu$, an estimated channel-envelope-to-noise-plus-interference power-ratio $\gamma$ and a channel-envelope power $\Omega$ to produce a target polynomial.

The extreme value determinator 230 is connected to the polynomial generator 220 in order to determine an extreme value of the polynomial and output a frequency corresponding to the extreme value as an estimated Doppler frequency $f^*_m$.

The estimated Doppler frequency $f^*_m$ is obtained by a maximum likelihood estimation. Namely, the estimated Doppler frequency $f^*_m$ is substituted into a cost function to thereby obtain an extreme value of the cost function. The cost function bases on a Rayleigh fading channel correlation function. Upon the maximum likelihood estimation, the cost function can be a likelihood function $\Lambda(f_m)$ or a logarithmic likelihood function $L(f_m)$, where $L(f_m) = -\ln(\Lambda(f_m))$.

When the cost function is the likelihood function $\Lambda(f_m)$, a maximum is derived from a corresponding target polynomial at the estimated Doppler frequency $f^*_m$. When the cost function is the logarithmic likelihood function $L(f_m)$, a minimum is derived from the corresponding target polynomial at the estimated Doppler frequency $f^*_m$.

In this embodiment, the cost function is the logarithmic likelihood function $L(f_m)$. Upon the maximum likelihood estimation and the Rayleigh fading channel, the logarithmic likelihood function $L(f_m)$ can be expressed as:

$$L(f_m) = \ln(\det(C)) + \frac{1}{\Omega} h^T C^{-1} h, \tag{1}$$

where $\Omega$ indicates a channel-envelope power, h indicates N channel sampling signals, $h^T$ indicates a transpose matrix of h, C indicates a Toelitz symmetry matrix corresponding to a covariance matrix of the N channel sampling signals h. The matrix C can be expressed as:

$$C = \gamma^{-1} I_N + \begin{bmatrix} 1 & J_0(2\pi T_S f_m) & J_0(4\pi T_S f_m) & \cdots & J_0((N-1)2\pi T_S f_m) \\ J_0(2\pi T_S f_m) & 1 & J_0(2\pi T_S f_m) & \ddots & \vdots \\ J_0(4\pi T_S f_m) & J_0(2\pi T_S f_m) & 1 & \ddots & J_0(4\pi T_S f_m) \\ \vdots & \vdots & \ddots & \ddots & J_0(2\pi T_S f_m) \\ J_0((N-1)2\pi T_S f_m) & \cdots & J_0(4\pi T_S f_m) & J_0(2\pi T_S f_m) & 1 \end{bmatrix}, \tag{2}$$

where $\gamma$ indicates an estimated channel-envelope-to-noise-plus-interference power-ratio, $I_N$ indicates a N×N unitary matrix, $J_0(.)$ indicates a Bessel function of the first kind and of order zero, $f_m$ indicates a maximum Doppler spread, and $T_s$ indicates a sampling interval. The estimated channel-envelope-to-noise-plus-interference power-ratio $\gamma$ can be expressed as $$\frac{\Omega}{\sigma_{n+i}^2},$$

where $\Omega$ indicates a channel-envelope power, and $\sigma_{n+i}^2$ indicates a standard deviation of a noise n and interference i. Accordingly, the method of the estimated Doppler frequency $f^*_m$ estimated by the Doppler frequency estimation system can be used to find a Doppler frequency $f^*_m$ to set the logarithmic likelihood function $L(f_m)$ to a minimum, i.e., it can be expressed in a math representation as:

$$\hat{f}_m^{(ML)} = \arg\min_{f_m} L(f_m). \tag{3}$$

In Equation (2), the zero-order Bessel function of the first kind $J_0(.)$ can be expressed as an even-power polynomial, i.e., $$J_0(x) = \sum_{k=0}^{\infty} g_k x^{2k}.$$

In this case, the zero-order Bessel function of the first kind $J_0(n\pi T_s f_m)$ in equation (2) is approximated to:

$$J_0(n\pi T_s f_m) = \sum_{k=0,1,\ldots}^{K} (g_k(n\pi T_s)^{2k}) f_m^{2k}, \tag{4}$$

where $\{g_k\}_{k=0,1,\ldots}$ indicates constants. The elements of the matrix C in equation (2) can be replaced by equation (4), and the matrix C can be approximated to:

$$C \cong \tilde{C}_K(f_m) = \gamma^{-1} I_n + \sum_{k=0}^{K} g_k(\pi T_s f_m)^{2k} A_k \equiv \gamma^{-1} I_n + B_K(f_m), \tag{5}$$

where K indicates a number of approximation orders, and $B_K(f_m)$ indicates a weight combination of $\{A_k\}_{k=0}^{K}$ which is a Toeplitz symmetry matrix and expressed as:

$$A_k = \begin{bmatrix} 0 & 1^{2k} & 2^{2k} & \ldots & (N-1)^{2k} \\ 1^{2k} & 0 & 1^{2k} & \ddots & \vdots \\ 2^{2k} & 1^{2k} & 0 & & 2^{2k} \\ \vdots & \ddots & & \ddots & 1^{2k} \\ (N-1)^{2k} & \ldots & 2^{2k} & 1^{2k} & 0 \end{bmatrix}, \tag{6}$$

for $0 \leq k \leq K$.

It is known from Equation (5) that $B_K(f_m)$ is a symmetry matrix. Thus, according to a normalized orthogonal matrix $V_K$ and a symmetry matrix $M_K(f_m)$, the matrix $B_K(f_m)$ can be approximated to:

$$B_k(f_m) \approx V_K M_k(f_m) V_K^T, \tag{7}$$

where $V_K$ has a size of $N \times \rho_K$. Namely, $V_K$ is formed of $\rho_K$ normalized orthogonal vectors, each being of N dimensions, and each element of $V_K$ is independent of $f_m$.

From equation (7), the symmetry matrix $M_K(f_m)$ can be rewritten as:

$$M_K(f_m) = V_K^T B_K(f_m) V_K, \tag{8}$$

where the symmetry matrix $M_K(f_m)$ indicates a full rank of $\rho_K \times \rho_K$ symmetry matrix, and the element of which is a polynomial of $f_m$. Although the approximate symbol '≈' is used in equation (7), the matrix in equation (7) equals to $V_K M_k(f_m) V_K^T$ as $V_K$ can be used to expand the vector space of the matrix $B_K(f_m)$. Namely, $\rho_K$ indicates a full or reduced rank of the matrix $B_K(f_m)$, for $1 \leq \rho_K \leq N$.

After $V_K$ is appropriately selected, the expanded space of $V_K$ equals to that of the feature vectors corresponding to $\rho_K$ greater eigenvalues of the matrix $B_K(f_m)$. Namely, the $\rho_K$ eigenvalues of the symmetry matrix $M_K(f_m)$ equals to the $\rho_K$ greater eigenvalues of the matrix $B_K(f_m)$ by appropriately selecting $V_K$.

As C is replaced by $\tilde{C}_K(f_m)$, the logarithmic likelihood function $L(f_m)$ in Equation (1) can be rewritten as:

$$L(f_m) = \ln(\det(\tilde{C}_K(f_m))) + \frac{1}{\Omega} h^T \tilde{C}_K(f_m)^{-1} h \equiv L_i(f_m) + L_d(f_m). \tag{9}$$

The logarithmic likelihood function $L(f_m)$ can be divided into two parts, one being a matrix determinant $L_i(f_m) = \ln(\det(\tilde{C}_K(f_m)))$ which is independent of the input, the other being a quadratic product $L_d(f_m) = \Omega^{-1} h^T \tilde{C}_K(f_m)^{-1} h$ which is dependent of the input. The matrix determinant $\det(\tilde{C}_K(f_m))$ can be obtained by an offline calculation, and the quadratic product item $L_d(f_m)$ is obtained by applying the N channel sampling signals $h = [h_1, h_2, \ldots, h_N]^T$ in an online calculation.

Upon the inverse matrix theorem, the inverse matrix $\tilde{C}_K(f_m)^{-1}$ to $\tilde{C}_K(f_m)$ in the quadratic product $L_d(f_m)$ can be approximated through $V_K$ and $M_K(f_m)$ to:

$$C_k(f_m)^{-1} \approx \gamma(I_N - V_K V_K^T) + V_K(\gamma^{-1} I_{\rho_K} + M_k(f_m))^{-1} V_K^T. \tag{10}$$

Similarly, the matrix determinant $\det(\tilde{C}_K(f_m))$ can be approximated through $V_K$ and $M_K(f_m)$ to:

$$\det(\tilde{C}_k(f_m)) \approx \gamma^{-(N-\rho K)} \det(\gamma^{-1} I_{\rho_K} + M_k(f_m)). \tag{11}$$

For special N and K, the elements of the inverse matrix $(\gamma^{-1} I_{\rho_K} + M_k(f_m))^{-1}$ in equation (10) is of an polynomial of $f_m$ and obtained by a Gaussian elimination. The determinant $\det(\gamma^{-1} I_{\rho_K} + M_k(f_m))$ in equation (11) is a polynomial of $f_m$, and a numerical process can be used to obtain the values of the determinant.

Thus, the determinant $\det(\tilde{C}_K(f_m))$ and inverse matrix $\tilde{C}_K(f_m)^{-1}$ corresponding to the matrix $\tilde{C}_K(f_m)$ is independent of the N channel sampling signals $h = [h_1, h_2, \ldots, h_N]^T$ and can be calculated in advance.

Since the determinant $\det(\gamma^{-1} I_{\rho_K} + M_k(f_m))$ is a polynomial of $f_m$, it can be expressed by an $r_i$-order polynomial of $f_m$, i.e., the natural log $L_i(f_m)$ of the determinant $\det(\tilde{C}_K(f_m))$ can be rewritten as:

$$L_i(f_m) = \ln(c_0(\gamma) + c_1(\gamma) f_m + \ldots + c_{r_i}(\gamma) f_m^{r_i}) = \ln(c(\gamma)^T f^{r_i}), \tag{12}$$

where $\{c_i(\gamma)\}_{i=0}^{r_i}$ indicates polynomial coefficients and a function of the estimated channel-envelope to noise and interference power ratio $\gamma$, and $c(\gamma) = [c_0(\gamma), c_1(\gamma), \ldots, c_{r_i}(\gamma)]^T$ and $f^{r_i} = [1, f_m, \ldots, f_m^{r_i}]^T$ are corresponding vector representations.

Since the vectors $v$ are used to represent $V_K^T h$, the quadratic product $L_d(f_m)$ can be rewritten as:

$$L_d(f_m) = \frac{1}{\Omega} v^T (\gamma^{-1} I_{\rho_K} + M_k(f_m))^{-1} v + \eta, \tag{13}$$

where $(\gamma^{-1} I_{\rho_K} + M_k(f_m))^{-1}$ indicates a weight sum of the multiple channel correlation vectors $v$, and $\eta = \Omega^{-1} \gamma h^T (I_N - V_K V_K^T) h$ which indicates an offset independent of $f_m$ without affecting calculation of $\hat{f}m^{(ML)}$. For a simplification, $\eta$ can be omitted. Accordingly, $$\hat{f}_m^{(ML)} = \arg\min_{f_m} \left\{ \ln(c(\gamma)^T f^{r_i}) + \frac{1}{\Omega} \frac{b(v, \gamma)^T f^{r_{d2}}}{a(\gamma)^T f^{r_{d1}}} \right\}$$

is regarded as a fractional polynomial of $f_m$, which can be rewritten as:

$$L_d(f_m) = \frac{1}{\Omega} \frac{b_0(v, \gamma) + b_1(v, \gamma) f_m + \ldots + b_{r_{d1}}(v, \gamma) f_m^{r_{d2}}}{a_0(\gamma) + a_1(\gamma) f_m + \ldots + a_{r_{d2}}(\gamma) f_m^{r_{d1}}} \tag{14}$$

$$= \frac{1}{\Omega} \frac{b(v, \gamma)^T f^{r_{d2}}}{a(\gamma)^T f^{r_{d1}}},$$

where $b(v, \gamma)$ and $a(\gamma)$ indicate coefficient vectors of fractional and denominator polynomials respectively. Namely, the log likelihood function $L(f_m)$ in Equation (9) can be rewritten as:

$$L(f_m) = \left\{ \ln(c(\gamma)^T f^{r_i}) + \frac{1}{\Omega} \frac{b(v,\gamma)^T f^{r_{d2}}}{a(\gamma)^T f^{r_{d1}}} \right\}. \quad (15)$$

A nonlinear maximum likelihood (ML) optimization can change equation (15) into:

$$\hat{f}_m^{(ML)} = \underset{f_m}{\mathrm{argmin}} \left\{ \ln(c(\gamma)^T f^{r_i}) + \frac{1}{\Omega} \frac{b(v,\gamma)^T f^{r_{d2}}}{a(\gamma)^T f^{r_{d1}}} \right\}. \quad (16)$$

For obtaining the coefficient vector $b(v, \gamma)$ of the fractional polynomial, a set of vectors $v=[v_1, v_2, \ldots, v_{\rho_K}]^T$ are determined by projecting the N channel sampling signals onto a normalized orthogonal base $V_K$.

Figure 3:
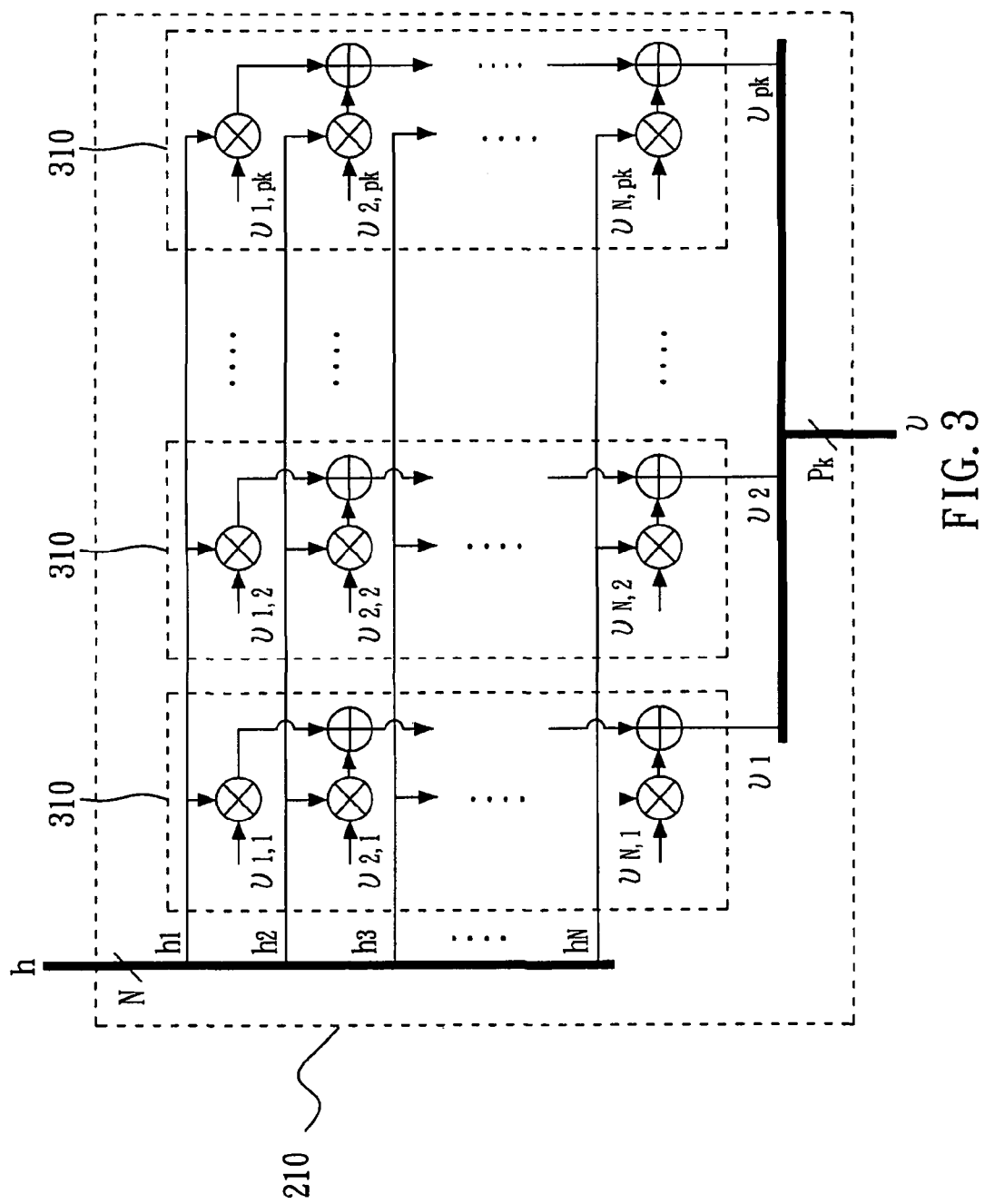
FIG. 3 is a schematic diagram of a basis projector according to an embodiment of the invention.

The basis projector 210 receives and projects N channel sampling signals $h=[h_1, h_2, \ldots, h_N]^T$ to a normalized orthogonal base $V_K$ to thereby generate multiple channel correlation vectors $v$. FIG. 3 is a schematic diagram of the basis projector 210 according to an embodiment of the invention. As shown in FIG. 3, the basis projector 210 includes $\rho_k$ correlators 310 in which i-th ($1 \le i \le \rho_K$) correlator has a coefficient of $[v_{1,i}, v_{2,i}, \ldots v_{N,i}]^T$. Namely, if $\{v_{i,j}\}$ represents an element of the normalized orthogonal base $V_K$, the normalized orthogonal base $V_K$ can be expressed as:

$$V_K = \begin{bmatrix} v_{1,1} & v_{1,2} & \ldots & v_{1,\rho_k} \\ v_{2,1} & v_{2,2} & \ldots & v_{2,\rho_k} \\ \vdots & \vdots & \ldots & \vdots \\ v_{N,1} & v_{N,2} & \ldots & v_{N,\rho_k} \end{bmatrix}. \quad (17)$$

The polynomial generator 220 is connected to the basis projector 210 in order to produce a target polynomial based on the multiple channel correlation vectors $v$, an estimated channel-envelope-to-noise-plus-interference power-ratio $\gamma$ and a channel-envelope power $\Omega$. The polynomial generator 220 finds the coefficients of the target polynomial for the extreme value determinator 230 to accordingly determine an extreme value of the target polynomial. The target polynomial is related to the log likelihood function $L(f_m)$. Namely, the nonlinear ML estimation is converted into a polynomial root-search procedure.

The key points of the invention focus on: (1) the design of the normalized orthogonal matrix $V_K$ for the basis projector 210; and (2) an algorithm for the extreme value determinator 230 to find an extreme value or minimum of the log likelihood function $L(f_m)$.

The basis projector 210 in FIG. 3 selects a normalized orthogonal base $V_K$ corresponding to the Toeplitz symmetry matrix $A_k$ in order to appropriately solve $B_K(f_m)$, where $$k' = \left\lceil \frac{\rho_K - 1}{2} \right\rceil.$$

By solving the eigenvalues of the Toeplitz symmetry matrix $A_k$, the $\rho_K$ feature vectors for the symmetry matrix $A_k$ are selected. The $\rho_K$ feature vectors correspond to the greater eigenvalues of the symmetry matrix $A_k$ to thereby form the vector space of $V_K$.

Another way to obtain $V_K$ is shown as follows. If the matrix $T_{\rho K}$ is defined as:

$$T_{\rho_K} = \begin{bmatrix} 0^0 & 0^1 & \ldots & 0^{\rho_K} \\ 1^0 & 1^1 & \ldots & 1^{\rho_K} \\ \vdots & \vdots & \ldots & \vdots \\ (N-1)^0 & (N-1)^1 & \ldots & (N-1)^{\rho_K} \end{bmatrix}, \quad (18)$$

and a Gram-Schmidt normalization is performed on each column of $T_{\rho_K}$ to accordingly obtain $\rho_K(N \times 1)$ vectors, so as to form another set of $V_K$.

The extreme value determinator 230 has a local extreme value detector 231 and a global extreme value determinator 233. The local extreme value detector 231 is connected to the polynomial generator 220 in order to divide the Doppler frequency $f_m$ into a plurality of subbands and calculate in each subband to determine whether there is an extreme value of a target polynomial. When an extreme value of the target polynomial exists in a subband, an index of the subband is outputted.

The global extreme value determinator 233 is connected to the local extreme value detector 231 in order to use an interpolation process to obtain a local minimum frequency respectively corresponding to each subband, apply the interpolation process to the local minimum frequency to thereby obtain an extreme value of the target polynomial in each subband, select a minimum one among the extreme values as the minimum of the target polynomial, and select the frequency corresponding to the minimum one as the estimated Doppler frequency.

The local extreme value detector 231 can divide the frequency $f_m$ into P subbands in equal or unequal. The equal division indicates each subband has a same size, and the unequal division indicates each subband is not necessary to have a same size. The bounds between the subbands are expressed as $\{f_1, f_2, f_{P+1}\}$, where $f_1$ and $f_{P+1}$ indicate a left and right bound of the frequency $f_m$. Preferably, the sizes of the subbands are selected to thereby contain only a local minimum in each subband.

The local extreme value detector 231 finds the position of the local minimum in each subband. The local minimum in each subband can present at a negative to positive transition position when a differential operation is performed on the log likelihood function $L(f_m)$. Namely, when a local minimum presents, $$\frac{\partial L(f_m)}{\partial f_m} = 0.$$

Each subband contains only a local minimum within the size selected, and in this case for $p=1, 2, \ldots, P+1$, a differential log likelihood $$\dot{L}_P = \left. \frac{\partial L(f_m)}{\partial f_m} \right|_{f_m = f_P}$$

can be defined at $f_P$. Thus, when the left bound $\dot{L}_P$ is smaller than zero and the right bound $\dot{L}_{P+1}$ is greater than zero, the p-th subband has the local minimum. Similarly, when $\dot{L}_1$ is greater than zero, the left bound of the frequency $f_m$ has the local minimum, and when $\dot{L}_{P+1}$ is smaller than zero, the right bound of the frequency $f_m$ has the local minimum. For clarity, the left and right bounds of the frequency $f_m$ are defined as the 0-th subband and the (P+1)-th subband respectively. It is noted that the values of $\{\dot{L}_p\}_{p=1}^{P+1}$ depend on $v, \gamma, \Omega$.

Figure 4:
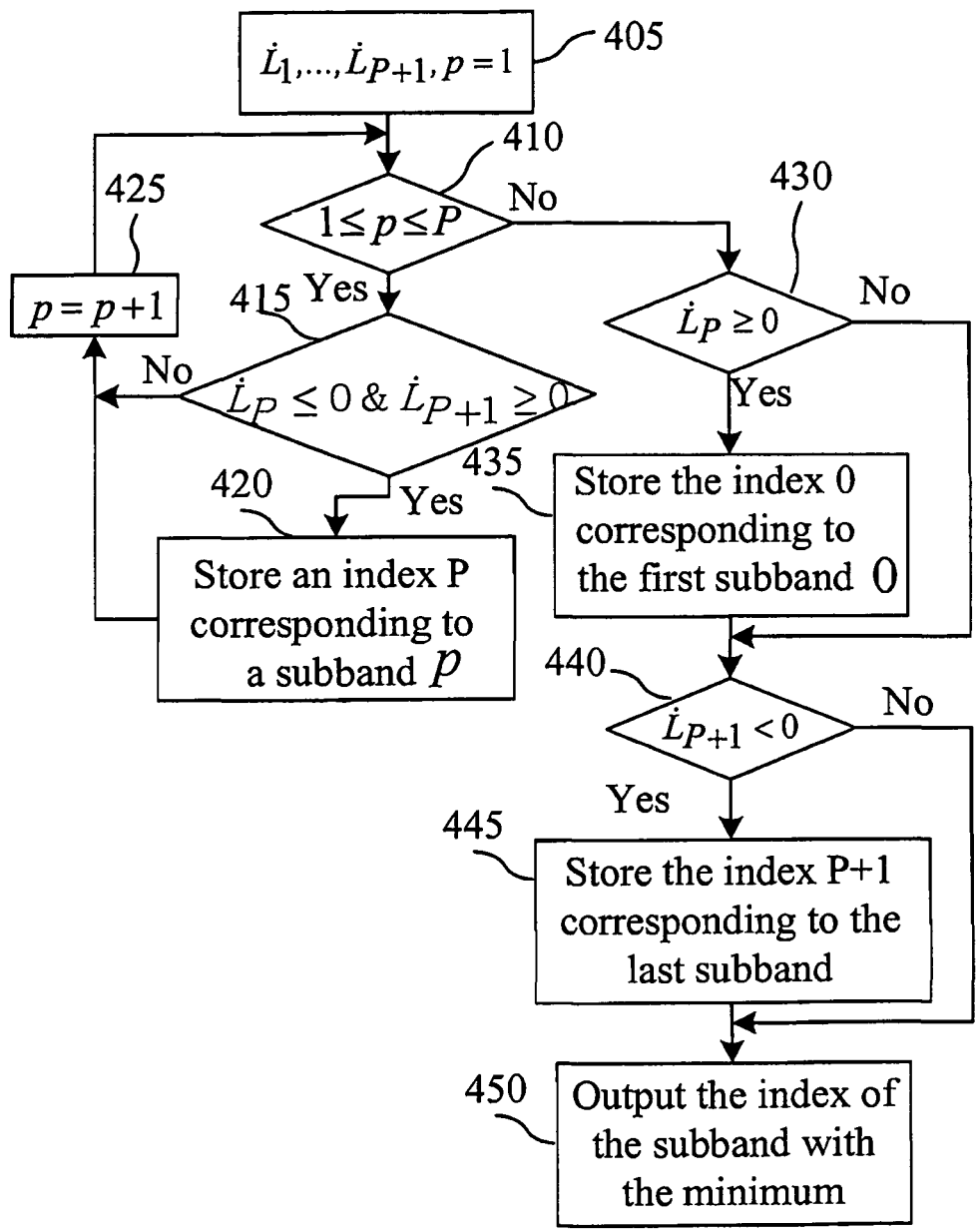
FIG. 4 is a flowchart of an operation of a local extreme value detector according to an embodiment of the invention.

FIG. 4 is a flowchart of an operation of the local extreme value detector 231 according to an embodiment of the invention. As shown in FIG. 4, step 405 reads a value of $\{\dot{L}_p\}_{p=1}^{P+1}$ and sets a point p=1. Step S410 determines whether the point p is greater than or equal to one and smaller than or equal to a predetermined value P; if yes, step S415 is executed, and conversely step S430 is executed.

Step S415 determines whether $\dot{L}_P$ is smaller than or equal to zero and $\dot{L}_{P+1}$ is greater than or equal to zero; if yes, it indicates that there is a local minimum in a p-th subband, and in this case step S420 stores the point p as the index p of the p-th subband, and conversely it indicates that there is no local minimum in a p-th subband, and in this case step S425 is executed to determine whether there is a local minimum in a next subband.

Step S430 determines whether $\dot{L}_1$ is greater than or equal to zero; if yes, it indicates that there is a local minimum at the left bound of the frequency $f_m$, and in this case step S435 stores the index 0 of the 0-th subband, and conversely it indicates that there is no local minimum at the left bound of the frequency $f_m$, and in this case step S440 is executed to determine whether $\dot{L}_{P+1}$ is smaller than zero. When $\dot{L}_{P+1}$ is smaller than zero, it indicates that there is a local minimum at the right bound of the frequency $f_m$, and in this case step S445 stores the index P+1 of the (P+1)-th subband. Conversely, it indicates that there is no local minimum at the right bound of the frequency $f_m$, and in this case step S450 is executed to output the index of the subband with the minimum.

The global extreme value determinator 233 is connected to the local extreme value detector 231 in order to receive the index of the subband output by the local extreme value detector 231. The global extreme value determinator 233 is based on the index of the subband to use an interpolation process to obtain a local minimum frequency corresponding to a subband with the minimum, and based on the local minimum frequency to use the interpolation process to obtain an extreme value of the target polynomial in a subband. Next, the global extreme value determinator 233 selects a minimum one among the extreme values as the minimum of the target polynomial and the frequency corresponding to the minimum one as the estimated Doppler frequency.

The local extreme value detector 231 outputs the index p to indicate that the p-th subband contains a local minimum. The global extreme value determinator 233 depends on equation (19) to find the local minimum frequency $f_p^{(cand)}$ corresponding to the local minimum in the p-th subband. The frequency $f_p^{(cand)}$ can be expressed as:

$$f_p^{(cand)} = \frac{\dot{L}_{P+1} f_p - \dot{L}_P f_{p+1}}{\dot{L}_{P+1} - \dot{L}_P}, \quad p = 1, \ldots, P, \quad (19)$$

where the left bound $f_1$ and right bound $f_{P+1}$ of the frequency $f_m$ are indicated by p=0 and p=P+1, respectively.

The global extreme value determinator 233 depends on equation (19) to find the extreme value $L(f_p^{(cand)})$ of the target polynomial corresponding to the local minimum frequency $f_p^{(cand)}$. The extreme value $L(f_p^{(cand)})$ can be expressed as:

$$L(f_p^{(cand)}) = L_p + \frac{\dot{L}_p}{2}(f_p^{(cand)} - f_p), \quad (20)$$

where $L_p = L(f_m)|_{f_m=f_p}$ is a value of the target polynomial at $f_m = f_p$. If a subband contains more than one extreme value of the target polynomial, all the extreme values are included in the choices to the global extreme value determinator 233 to thereby select a minimum one among the extreme values of the target polynomial as the minimum of the target polynomial and the frequency corresponding to the minimum one as the estimated Doppler frequency $\hat{f}_m^{(ML)}$.

$$\hat{f}_m^{(ML)} \approx \arg\min\{L(f_p^{(cand)})\}. \quad (21)$$

Figure 5:
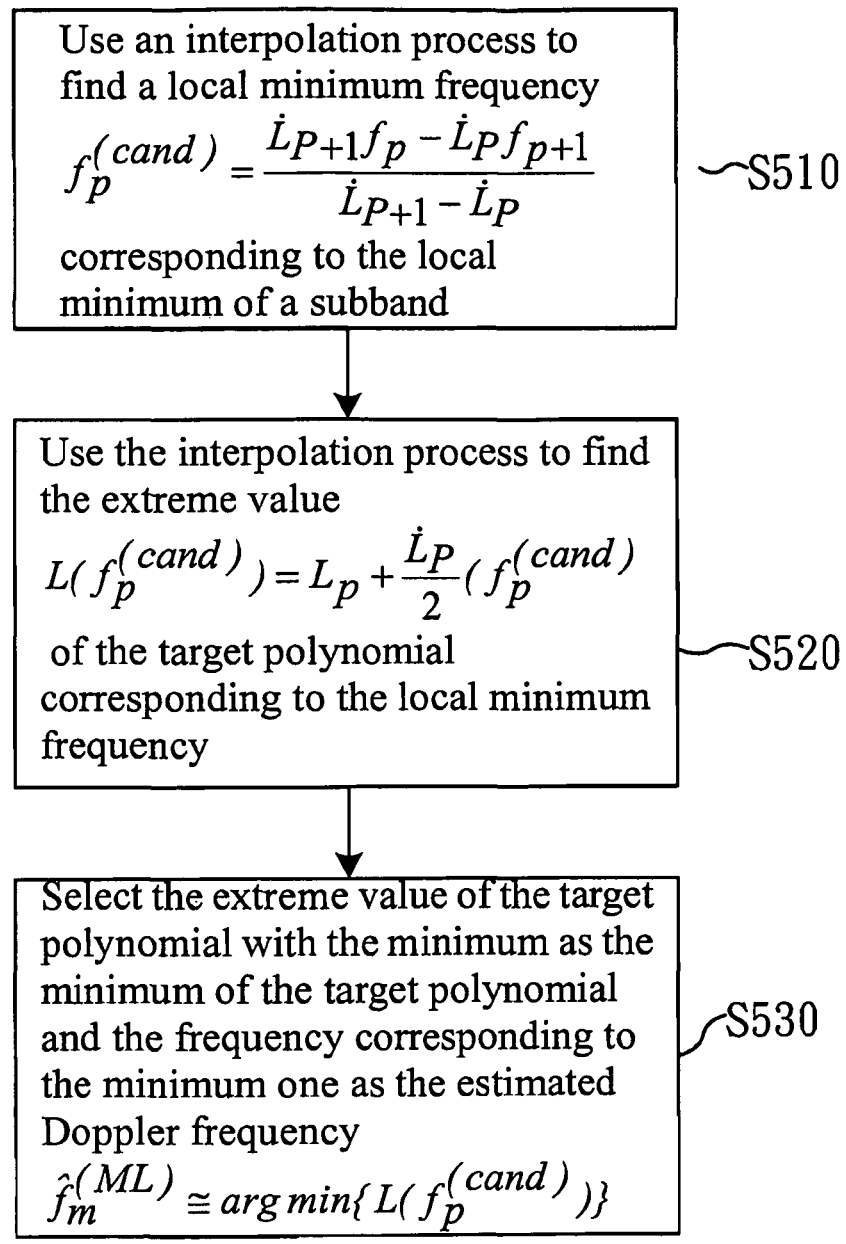
FIG. 5 is a flowchart of an operation of a global extreme value determinator according to an embodiment of the invention.

FIG. 5 is a flowchart of an operation of the global extreme value determinator 233 according to an embodiment of the invention. As shown in FIG. 5, in step S510, the global extreme value determinator 233 uses the interpolation process to find the local minimum frequency $f_p^{(cand)}$ corresponding to the local minimum in the p subband, for p=1 to P.

In step S520, the global extreme value determinator 233 uses the interpolation process to find the extreme value $L(f_p^{(cand)})$ of the target polynomial corresponding to the local minimum frequency $f_p^{(cand)}$.

In step S530, the global extreme value determinator 233 receives at least one extreme value $L(f_p^{(cand)})$ of the target polynomial that is generated in step S520 and selects the minimum one among the extreme values of the target polynomial as the minimum of the target polynomial and the frequency corresponding to the minimum one as the estimated Doppler frequency $\hat{f}_m^{(ML)}$.

As cited, the global extreme value determinator 233 has to use the values $\{L_p\}_{p=1}^{P+1}$ and $\{\dot{L}_p\}_{p=1}^{P+1}$. The target polynomial is differentiated to produce equation (22) as follows:

$$L(f_m) = \frac{b_i^T(\gamma)f^{r_i-1}}{a_i^T(\gamma)f^{r_i}} + \frac{1}{\Omega}\frac{b_d^T(v,\gamma)f^{r_{d1}+r_{d2}-1}}{a_d^T(\gamma)f^{2r_{d1}}}, \quad (22)$$

and accordingly the value of $\{\dot{L}_p\}_{p=1}^{P+1}$ can be expressed as:

$$\dot{L}(f_p) = \left.\frac{\dot{b}_i^T(\gamma)f^{r_i-1}}{\dot{a}_i^T(\gamma)f^{r_i}} + \frac{1}{\Omega}\frac{\dot{b}_d^T(v,\gamma)f^{r_{d1}+r_{d2}-1}}{\dot{a}_d^T(\gamma)f^{2r_{d1}}}\right|_{f_m=f_p}, \quad (23)$$

$$p = 1, \ldots, P.$$

Namely, for a given $f_p$, $\dot{b}_d^T(v,\gamma) f^{r_{d1}+r_{d2}-1}|_{f_m=f_p}$ has a form of $$\sum_{s=0}^{r_{d1}+r_{d2}-1} \sum_{l=1}^{\rho_K} \sum_{j=1}^{\rho_K} c(j,l,s) v_j v_l \gamma^s, \quad (24)$$

and $\dot{a}_i^T(\gamma)f^{r_i}|_{f_m=f_p}, \dot{b}_i^T(\gamma)f^{r_i-1}|_{f_m=f_p}, \dot{a}_i^T(\gamma)f^{2r_{d1}r_i}|_{f_m=f_p}$ are in a form of $$\sum_s c(s)\gamma^s, \quad (25)$$

where c(s) and c(j,l,s) are scalar coefficients.

For convenience of referring to lookup tables, $$\left\{ \ln(c(\gamma)^T f^{r_i}) + \frac{1}{\Omega} \frac{b(v,\gamma)^T f^{r_{d2}}}{a(\gamma)^T f^{r_{d1}}} \right\}$$

in equation (15) can be rewritten as $$L(f_m) = w1 + \frac{w2}{w3}\frac{1}{\Omega},$$

and the differentiation of $$\left\{ \ln(c(\gamma)^T f^{r_i}) + \frac{1}{\Omega} \frac{b(v,\gamma)^T f^{r_{d2}}}{a(\gamma)^T f^{r_{d1}}} \right\}$$

is rewritten as $$\dot{L}(f_m) = \frac{z1(\gamma)}{z2(\gamma)} + \frac{z3(r,v)}{z4(r,v)}\frac{1}{\Omega}.$$

FIGS. 6-11 show schematic graphs of values of w1, w2, w3 when $f_p^{(cand)}$ equals to 1 Hz, 41 Hz, 81 Hz, 121 Hz, 161 Hz, 201 Hz respectively according to an embodiment of the invention, for N=40, K=2 and $\rho_K$=5. As shown in FIGS. 6 to 11 for the frequency $f_p^{(cand)}$ at 1 Hz, 41 Hz, 81 Hz, 121 Hz, 161 Hz, 201 Hz respectively, the values of $L(f_m)$ can be calculated according to w1, w2, w3.

FIGS. 12-17 are first to sixth tables. FIGS. 12-17 are schematic graphs of values of z1, z2, z3, $d_h$ when $f_p^{(cand)}$ equals to 1 Hz, 41 Hz, 81 Hz, 121 Hz, 161 Hz, 201 Hz respectively according to an embodiment of the invention. According to z1, z2, z3, $d_h$ shown in FIGS. 12 to 17, the values of $\dot{L}(f_m)$ can be calculated for the frequency $f_p^{(cand)}$ at 1 Hz, 41 Hz, 81 Hz, 121 Hz, 161 Hz, 201 Hz respectively.

Figure 18:
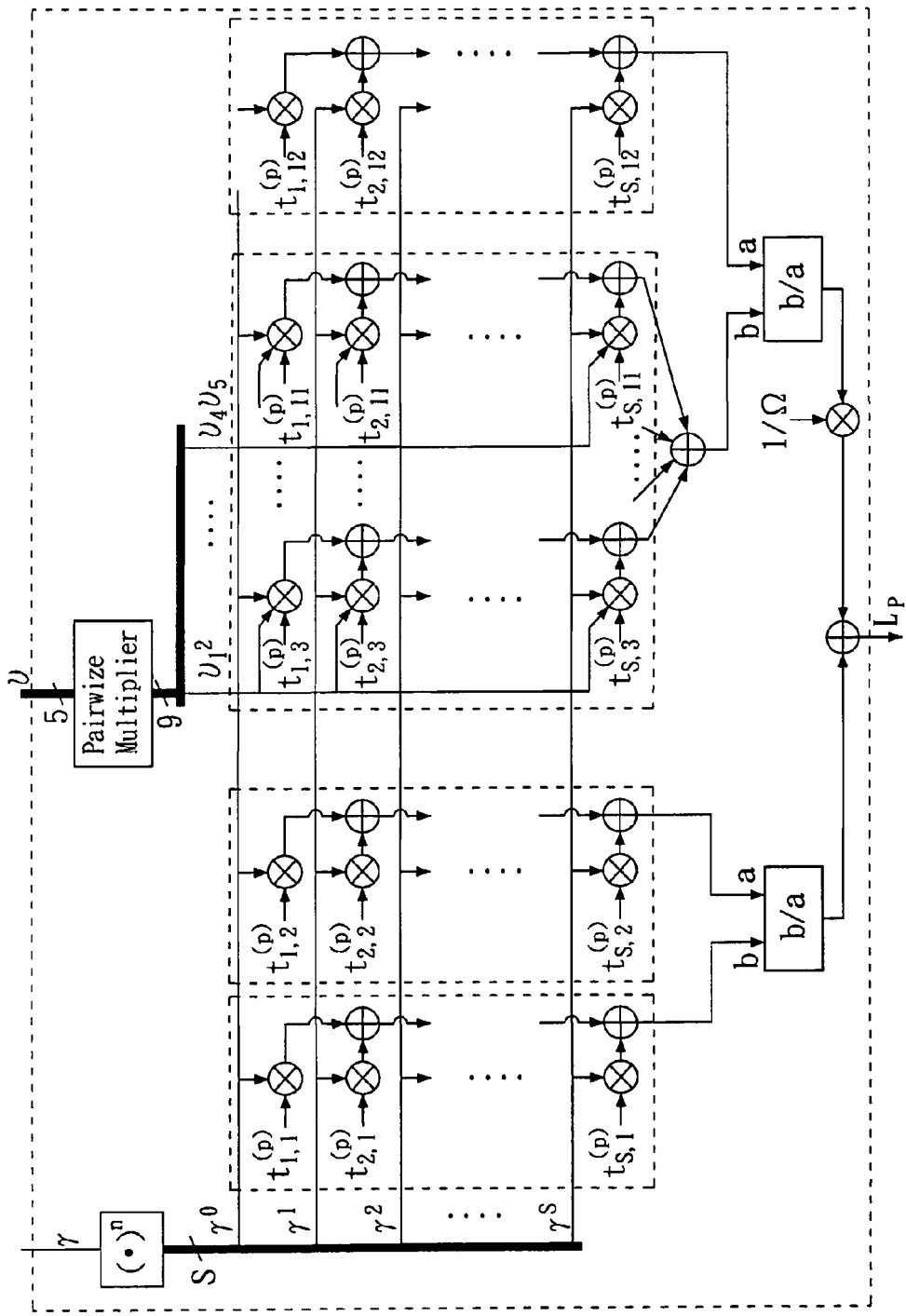
FIG. 18 is a schematic circuit of estimated values of $\hat{L}_p(\nu, \gamma, \Omega)$ according to an embodiment of the invention.

In FIGS. 12 to 17, each row indicates coefficients corresponding to $\{\gamma^s\}_{s=0}^{S_p}$, and $S_p$ indicates the highest order γ of $\dot{L}_p(v,\gamma,\Omega)$. As shown in FIGS. 12 to 17, there are some tiny coefficients, which can be omitted without affecting the precise, and thus $S_p$ is different in different figures. In addition, the z3 field contains subfields which are related to the input parameters as follows. When K=2 and $\rho_K$=5, the z3 field contains nine subfields, $(v_1^2, v_2^2, v_3^2, v_4^2, v_5^2, v_1v_2, v_3v_4, v_3v_5, v_4v_5)$. For example, at the third column in the first subfield, the coefficient of $\gamma^2 v_1^2$ is present. The bounds of $\dot{L}_p(v,\gamma,\Omega)$ between the subbands can be estimated according to the tables of FIGS. 12 to 17 and v, γ, Ω. FIG. 18 is a schematic circuit for estimating the values of $\dot{L}_p(v,\gamma,\Omega)$ according to an embodiment of the invention, where $t_{i,j}^{(p)}$ indicates the coefficient of i-th row and j-th column of the p-th table. By looking up the tables and the circuit shown in FIG. 18, the values of $\dot{L}_p(v,\gamma,\Omega)$ can be estimated.

Figure 19:
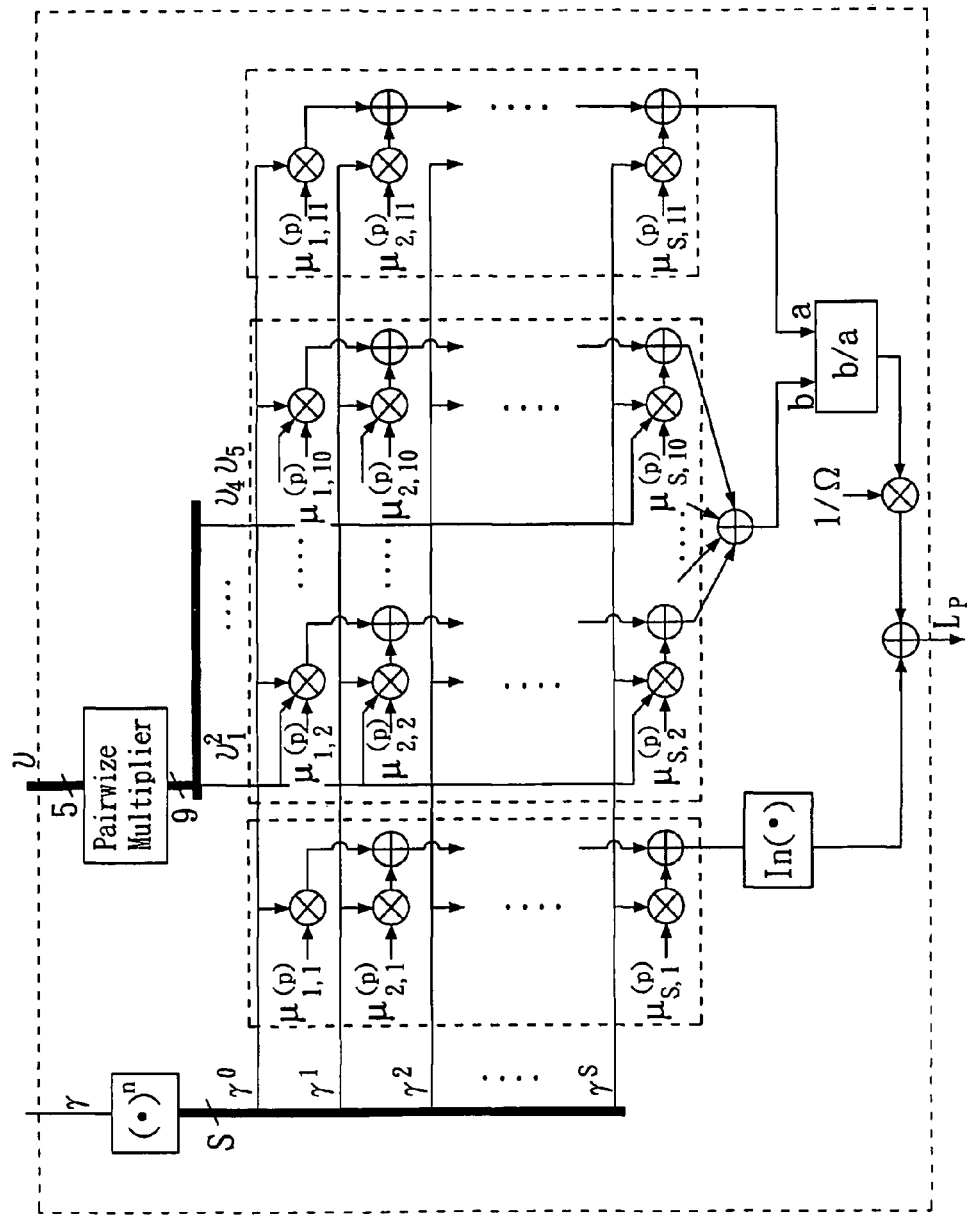
FIG. 19 is a schematic circuit of estimated values of $L_p(\nu, \gamma, \Omega)$ according to an embodiment of the invention.

Similarly, FIGS. 6 to 11 show the values of w1, w2, w3 in equation (26) respectively listed in first to sixth tables. The bounds of $L_p(v,\gamma,\Omega)$ between the subbands can be estimated according to the tables shown in FIGS. 6 to 11 and v, γ, Ω. FIG. 19 is a schematic circuit for estimating the values of $L_p(v,\gamma,\Omega)$ according to an embodiment of the invention, where $u_{i,j}^{(p)}$ indicates an i-th row and j-th column coefficient in the p-th table. By looking up the tables and the circuit shown in FIG. 19, the values of $L_p(v,\gamma,\Omega)$ can be estimated.

Figure 20A:
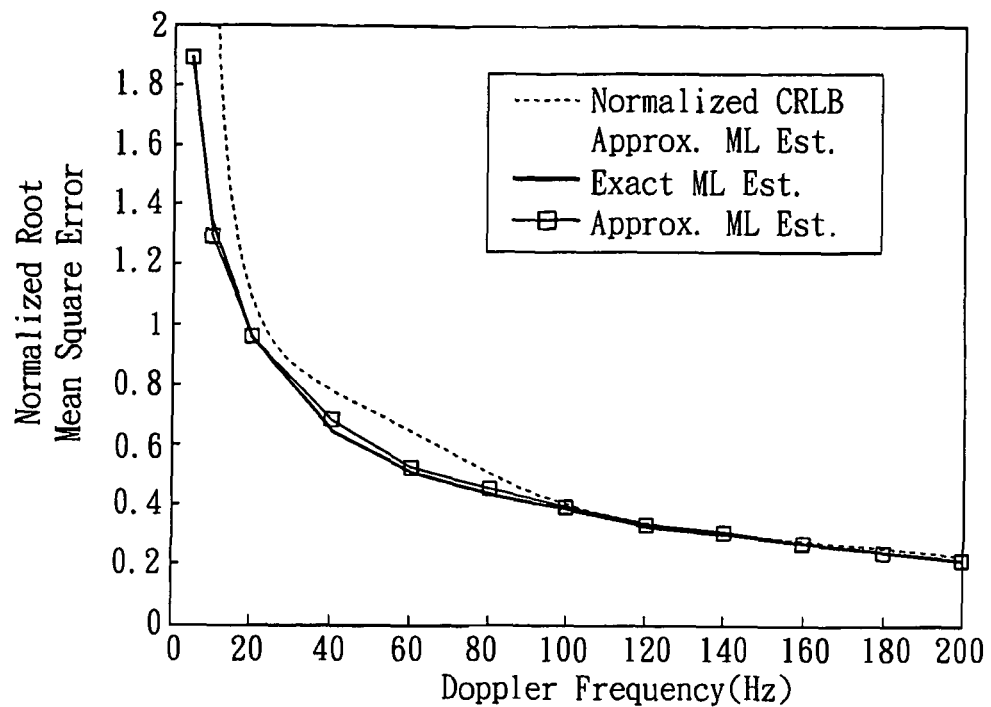
FIGS. 20 (A) and (B) are schematically illustrates a comparison of a normalized root mean square error and a Doppler frequency estimation according to an embodiment of the invention.
Figure 20B:
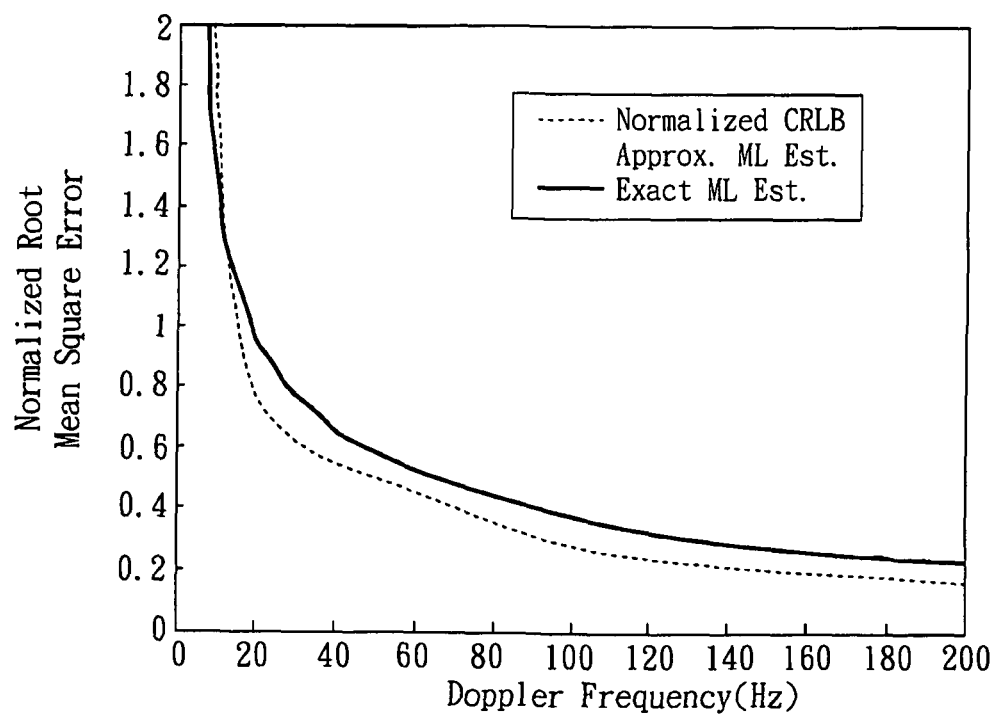

FIGS. 20 (A) and (B) are schematic graphs of a comparison of a Doppler frequency estimation according to an embodiment of the invention. In FIGS. 20 (A) and (B), as compared with an exact Doppler frequency, the horizontal axis indicates an exact Doppler frequency, and the vertical axis indicates a normalized root mean square error defined as follows.

$$RMSE_{Norm} = \frac{\left(E\left[(f_m - \hat{f}_m)^2\right]\right)^{\frac{1}{2}}}{f_m}. \tag{28}$$

This comparison shown in FIGS. 20 (A) and (B) is emulated under a WCDMA communication system. Among the corresponding parameters, a symbol duration is set to 66.67 μs, the channel is a Rayleigh fading channel, the estimated channel-envelope-to-noise-plus-interference power-ratio γ equals to 7 dB, the length N of the vector estimation equals to 50, and K=3. In FIGS. 20 (A) and (B), the Doppler estimate produced by the Doppler frequency estimation system is shown by a solid line, and the normalized root mean square Cramer-Rao lower bound (CRLB) derived from the theory is shown by a dotted line. As shown in FIGS. 20 (A) and (B), the precise of the Doppler estimation of the invention can be approximated to the ideal CRLB in the Doppler estimation range.

Figure 21A:
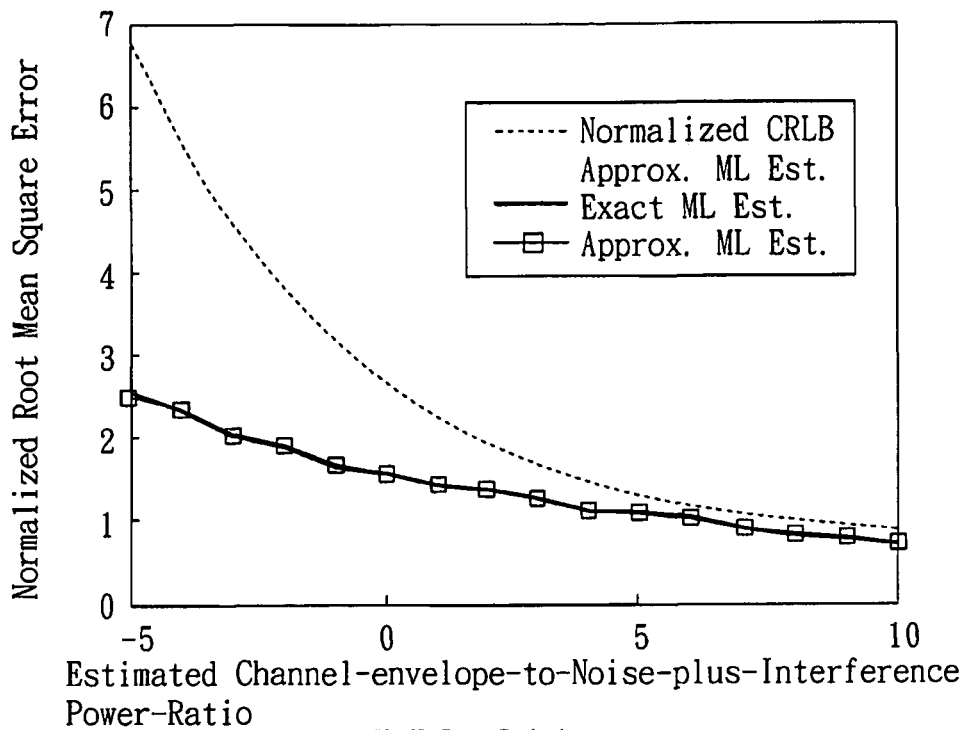
FIGS. 21 (A) and (B) are schematically illustrates a comparison of a normalized root mean square error and an estimated channel-envelope-to-noise-plus-interference power-ratio according to an embodiment of the invention.
Figure 21B:
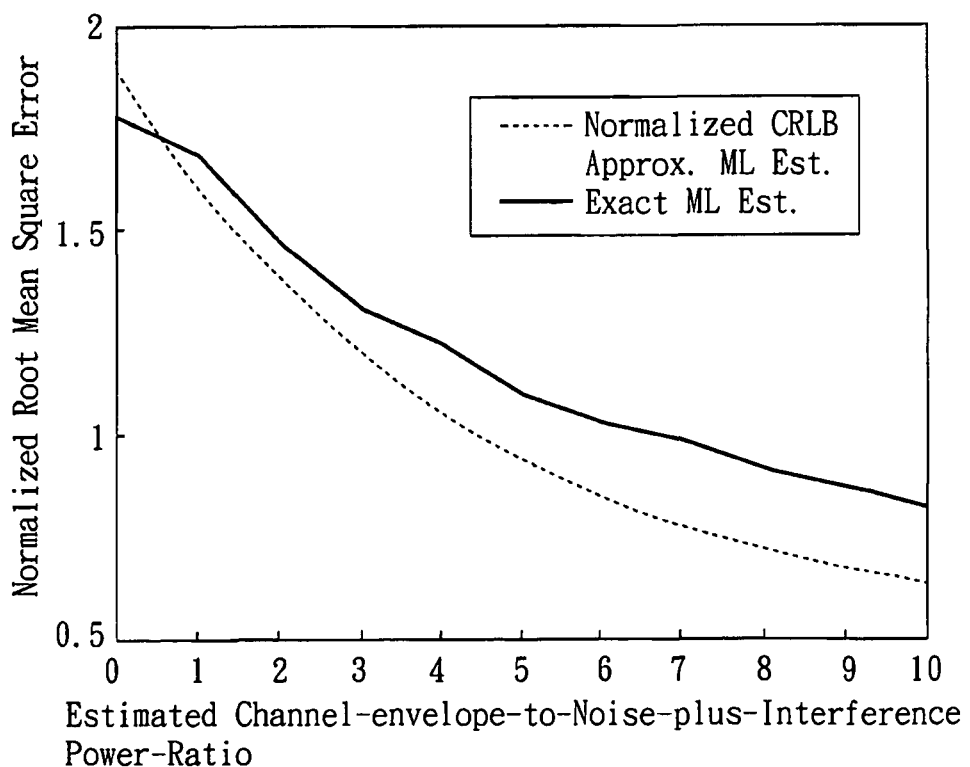

FIGS. 21 (A) and (B) are schematic graphs of a comparison of the normalized root mean square error and the estimated channel-envelope-to-noise-plus-interference power-ratio γ according to an embodiment of the invention. In FIGS. 21 (A) and (B), this comparison is performed under the very low Doppler frequency at $f_m$=20 Hz, and the corresponding parameters are set as same as those shown in FIGS. 20 (A) and (B). As shown in FIGS. 21 (A) and (B), the normalized root mean square error of the Doppler frequency has a limited difference from the ideal CRLB in the detecting range of the estimated channel-envelope-to-noise-plus-interference power-ratio, so the invention can provide an accurate Doppler estimate.

In this embodiment, the tables shown in FIGS. 6 to 17 are carried out by the polynomial generator 220. Namely, the polynomial generator 220 produces the target polynomials (15) and (22) and outputs the values of the log likelihood function $L(f_m)$ and the differential function $\dot{L}(f_m)$.

In view of the foregoing, it is known that the invention can overcome the problem of increasing the entire system cost to cope with the data amount increase in the prior art or inaccurately estimating the Doppler frequency at the receiver of a low cost configuration in the prior art. In comparison with the direct use of maximum likelihood estimation, the sampled signals of N channels are projected into $\rho_K$ values ($\rho_K$<N) and then Doppler frequency estimation is performed, so as to avoid directly using N original signals for estimation, thereby decreasing the computation complexity. In addition to the reduced data processing amount and system cost, the invention uses the lookup tables to accurately and rapidly estimate the Doppler frequency.

Although the present invention has been explained in relation to its preferred embodiment, it is to be understood that many other possible modifications and variations can be made without departing from the spirit and scope of the invention as hereinafter claimed.

What is claimed is:

1. A Doppler frequency estimation system, comprising:
   a basis projector, for receiving and projecting channel sampling signals to a set of orthogonal bases to generate channel correlation vectors correspondingly;
   a polynomial generator, connected to the basis projector, for producing a target polynomial according to the channel correlation vectors, an estimated channel-envelope-to-noise-plus-interference power-ratio and a channel-envelope power; and
   an extreme value determinator, connected to the polynomial generator, for determining an extreme value of the target polynomial and outputting a frequency corresponding to the extreme value as an estimated Doppler frequency;
   wherein the extreme value determinator comprises:
   a local extreme value detector, connected to the polynomial generator, for dividing the Doppler frequency into a plurality of sub-bands and determining an extreme value of the target polynomial from each of the subbands, and then outputting an index of the sub-band corresponding to the extreme value of the target polynomial; and
   a global extreme value determinator, connected to the local extreme value detector, for obtaining a local minimum and a local minimum frequency respectively from each of the sub-bands, obtaining the extreme value of the target polynomial from each of the sub-bands according to the local minimum frequency, selecting a minimum value among the extreme values as the minimum of the target polynomial, and the frequency corresponding to the minimum value as the estimated Doppler frequency;
   wherein the local extreme value detector configured to perform the following procedures:
   (A) read a value of $\{\dot{L}_p\}_{p=1}^{P+1}$ and set a point to one, where $$\dot{L}_P = \left.\frac{\partial L(f_m)}{\partial f_m}\right|_{f_m=f_P},$$

for $f_m$ indicates an estimated frequency range, P indicates a number of the sub-bands, and $L(f_m)$ indicates the logarithmic likelihood function;
   (B) determine whether the point is greater than or equal to one and smaller than or equal to a predetermined value, and execute step (C) when the point is greater than or equal to one and smaller than or equal to a predetermined value, otherwise, execute step (F);
   (C) determine whether $\dot{L}_p$ is smaller than or equal to zero and $\dot{L}_{p+1}$ is greater than or equal to zero, execute step (D) when $\dot{L}_p$ is smaller than or equal to zero and $\dot{L}_{p+1}$ is greater than or equal to zero, which indicates that the local minimum exists in a p-th sub-band, otherwise, which indicates that there is no the local minimum in the p-th sub-band, then execute step (E);
   (D) store an index corresponding to the p-th sub-band;
   (E) determine whether the local minimum exists in a next sub-band;
   (F) determine whether $\dot{L}_1$ is greater than or equal to zero, and execute step (G) when $\dot{L}_1$ is greater than or equal to zero, which indicates that the local minimum exists at the left bound of the frequency range $f_m$, otherwise, which indicates that there is no the local minimum at the left bound of the frequency range $f_m$, execute step (H);
   (G) store an index corresponding to the 0-th sub-band which is the first one among the sub-bands;
   (H) determine whether $\dot{L}_{p+1}$ is smaller than zero, and execute (I) when $\dot{L}_{p+1}$ is smaller than zero, which indicates that the local minimum exists at the right bound of the frequency range $f_m$, otherwise, which indicates that there is no the local minimum at the right bound of the frequency range $f_m$, execute step (J);
   (I) store an index corresponding to the (P+1)-th sub-band which is the last one among the sub-bands; and
   (J) output the index of the sub-band with the local minimum.

2. The estimation system as claimed in claim 1, wherein the target polynomial corresponds to a cost function.

3. The estimation system as claimed in claim 2, wherein the cost function bases on a Rayleigh fading channel, and the target polynomial is a function of a Doppler frequency.

4. The estimation system as claimed in claim 3, wherein the target polynomial is found a maximum at the estimated Doppler frequency when the cost function is a likelihood function.

5. The estimation system as claimed in claim 3, wherein the target polynomial is found a minimum at the estimated Doppler frequency when the cost function is a logarithmic likelihood function.

6. The estimation system as claimed in claim 5, wherein the extreme value determinator uses lookup tables to calculate the extreme value of the target polynomial in each sub-band.

7. The estimation system as claimed in claim 1, wherein the global extreme value determinator performs the steps of:
   (K) using an interpolation process to find the local minimum frequency corresponding to the local minimum from each of the sub-bands;
   (L) using the interpolation process to find the extreme value of the target polynomial corresponding to the local minimum frequency; and
   (M) receiving at least one extreme value of the target polynomial that is generated in step (L) and selecting the minimum one among the extreme values of the target polynomial as the minimum of the target polynomial and the frequency corresponding to the minimum one as the estimated Doppler frequency.

8. A Doppler frequency estimation method for a wireless communication system, comprising:
   a basis projecting step, for receiving and projecting channel sampling signals to a set of orthogonal bases to generate channel correlation vectors correspondingly;
   a polynomial generating step, for producing a target polynomial based on the channel correlation vectors, an estimated channel-envelope-to-noise-plus-interference power-ratio and a channel-envelope power; and
   an extreme value determining step, for determining an extreme value of the polynomial and outputting an estimated Doppler frequency corresponding to the extreme value;
   wherein the extreme value determining step comprises:
   a local extreme value detecting step, for dividing the Doppler frequency into a plurality of sub-bands and calculating in each of the sub-bands to determine whether there is the extreme value of the target polynomial, and then outputting an index of the sub-band corresponding to the extreme value of the target polynomial; and
   a global extreme value determining step, for obtaining a local minimum and a local minimum frequency respectively from each of the sub-bands, obtaining the extreme value of the target polynomial from each of the sub-bands according to the local minimum frequency, selecting a minimum value among the extreme values as the minimum of the target polynomial, and selecting the estimated Doppler frequency corresponding to the minimum value;

wherein the local extreme value detecting step comprises:

(A) reading a value of $\{\dot{L}_{p,p=1}^P$ and setting a point to one, where $$\dot{L}_P = \left.\frac{\partial L(f_m)}{\partial f_m}\right|_{f_m=f_P},$$

for $f_m$ indicates an estimated frequency range, P indicates a number of the sub-bands, and $L(f_m)$ indicates the logarithmic likelihood function;

(B) determining whether the point is greater than or equal to one and smaller than or equal to a predetermined value, and executing step (C) when the point is greater than or equal to one and smaller than or equal to a predetermined value, and conversely executing step (F);

(C) determining whether $\dot{L}_p$ is smaller than or equal to zero and $\dot{L}_{P_{T_i}}$ is greater than or equal to zero, executing (D) when $\dot{L}_p$ is smaller than or equal to zero and $\dot{L}_{P_{T_i}}$ is greater than or equal to zero, which indicates that the local minimum exists in a p-th sub-band, and conversely, which indicates that there is no the local minimum in the p-th sub-band, executing (E);

(D) storing an index corresponding to the p-th sub-band;

(E) determining whether the local minimum exists in a next sub-band;

(F) determining whether $\dot{L}_1$ is greater than or equal to zero, and executing step (G) when $\dot{L}_1$ is greater than or equal to zero, which indicates that the local minimum exists at the left bound of the frequency range $f_m$, and conversely, which indicates that there is no the local minimum at the left bound of the frequency range $f_m$, executing step (H);

(G) storing an index corresponding to the 0-th sub-band which is the first one among the sub-bands;

(H) determining whether $\dot{L}_{P_{T_i}}$ is smaller than zero, and executing step (I) when $\dot{L}_{P_{T_i}}$ is smaller than zero, which indicates that the local minimum exists at the right bound of the frequency range $f_m$, and conversely, which indicates that there is no local minimum at the right bound of the frequency range $f_m$, executing step (J);

(I) storing an index corresponding to the (P+1)-th sub-band which is the last one among the sub-bands; and (J) outputting the index of the sub-band with the local minimum.

9. The estimation method as claimed in claim 8, wherein the target polynomial corresponds to a cost function.

10. The estimation method as claimed in claim 9, wherein the cost function bases on a Rayleigh fading channel, and the target polynomial is a function of a Doppler frequency.

11. The estimation method as claimed in claim 10, wherein the target polynomial is found a maximum at the estimated Doppler frequency when the cost function is a likelihood function.

12. The estimation method as claimed in claim 10, wherein the target polynomial is found a minimum at the estimated Doppler frequency when the cost function is a logarithmic likelihood function.

13. The estimation method as claimed in claim 12, wherein the extreme value determining step uses lookup tables to calculate the extreme value of the target polynomial in each of the sub-bands.

14. The estimation method as claimed in claim 8, wherein the global extreme value determining step comprises:

(K) using an interpolation process to find the local minimum frequency corresponding to the local minimum from each of the sub-bands;

(L) using the interpolation process to find the extreme value of the target polynomial corresponding to the local minimum frequency; and (M) receiving at least one extreme value of the target polynomial that is generated in step (L) and selecting the minimum one among the extreme values of the target polynomial as the minimum of the target polynomial and the frequency corresponding to the minimum one as the estimated Doppler frequency.

* * * * *